(12) United States Patent  (10) Patent No.: US 8,243,264 B2
Isozaki et al.  (45) Date of Patent: *Aug. 14, 2012

(54) MEASURING APPARATUS

(75) Inventors: Hisashi Isozaki, Itabashi-ku (JP);
Yoshiyuki Enomoto, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 12/857,874

(22) Filed: Aug. 17, 2010

(65) Prior Publication Data

US 2011/0043825 A1  Feb. 24, 2011

(30) Foreign Application Priority Data

Aug. 18, 2009  (JP) ................................ 2009-189438

(51) Int. Cl.
*G01N 21/00* (2006.01)
(52) U.S. Cl. .................................. 356/237.4; 356/237.5
(58) Field of Classification Search ..... 356/237.1–237.6
See application file for complete search history.

(56) References Cited

U.S. PATENT DOCUMENTS

2011/0043808 A1* 2/2011 Isozaki et al. ................. 356/445

FOREIGN PATENT DOCUMENTS

JP  2000-266523  9/2000

* cited by examiner

*Primary Examiner* — Tri T Ton
(74) *Attorney, Agent, or Firm* — Wenderoth, Lind & Ponack, L.L.P.

(57) ABSTRACT

A measuring apparatus measuring a surface shape of a target includes a projection optical system to radiate a line beam on the target, an imaging device to acquire a reflected line beam reflected from the target, an optical imaging system to cause the reflected line beam to form an image on a receiving surface of the imaging device to acquire a shape of the line beam on the target, and a splitting mechanism to split the reflected line beam so as to acquire the shape of the line beam on the target at different positions in an extending direction of the line beam and guide the split reflected line beams to the imaging device. A plurality of segments are set on the receiving surface while each segment in which at least one region is set as a reception region is partitioned into a plurality of regions, and the optical imaging system causes the split reflected line beams to form images on the reception regions in the different segments, respectively.

6 Claims, 11 Drawing Sheets

MEASURING APPARATUS

CROSS REFERENCE TO RELATED APPLICATIONS

The present application is based on and claims priority from Japanese Application Number 2009-189438, filed on Aug. 18, 2009, the disclosure of which is hereby incorporated by reference herein in its entirety.

BACKGROUND OF THE INVENTION

1. Field of the Invention

The present invention relates to a measuring apparatus for measuring a measurement target, and particularly relates to a measuring apparatus for measuring a measurement target by use of a light beam.

2. Description of the Related Art

Some wafers, for example, are known to be provided with ball-shaped terminals (referred to below as bumps) formed by soldering or the like to provide wiring for each electronic component. As one of inspections for the electronic components, such wafers before dicing are inspected by measuring the height of each bump. To measure the height of a bump, the following type of measuring apparatus has been employed (see JP-A 2000-266523, for example). Specifically, in this apparatus, a wafer as a measurement target is irradiated with a laser beam or the like (referred to below as a line beam), an image of the part irradiated with the line beam is picked up by an imaging device, and the heights in certain parts of the wafer, that is, the heights of the bumps and the like are measured by use of the image data. In this measuring apparatus, an optical imaging system is provided between the imaging device and the measurement target. The optical imaging system is set so that the imaging device is capable of picking up an image of the part irradiated with the line beam.

From the viewpoint of manufacturing efficiency of a measurement target (a wafer in the above example), in the measurement of the measurement target, it is required to make time required for measuring (referred to below as measuring time) as short as possible while maintaining a certain accuracy. For this reason, in the above-mentioned optical imaging system, an optical setting is determined for an object for measurement (each bump in the example above) in the measurement target to make the measuring time as short as possible while maintaining certain accuracy.

However, the apparatus described above has a limitation on the speed at which the imagining device performs output processing on acquired data, and thus also has a limitation on the shortening of the measuring time if a certain accuracy is to be maintained.

SUMMARY OF THE INVENTION

The present invention has been made in view of the above circumstances, and aims to provide a measuring apparatus capable of shortening the measuring time while maintaining a certain accuracy.

A measuring apparatus according to an example of the present invention is a measuring apparatus which comprises: a projection optical system configured to radiate a line beam extending in one direction on a measurement target; an imaging device configured to acquire a reflected line beam reflected from the measurement target, the measuring apparatus measuring a surface shape of the measurement target on the basis of a geometric positional relationship in the reflected line beam on the measurement target, the reflected line beam being acquired by the imaging device; an optical imaging system provided between the measurement target and the imaging device, and configured to cause the reflected line beam to form an image on a receiving surface of the imaging device so that a shape of the line beam on the measurement target is acquired; and a beam splitting mechanism configured to split, the reflected line beam and guide the split reflected line beam to the imaging device. The beam splitting mechanism splits the reflected line beam so that the shape of the line beam on the measurement target is acquired at different measurement positions in the extending direction of the line beam; a plurality of segments are set on the receiving surface of the imaging device while each of the segments is partitioned into a plurality of regions, and at least one region in each of the segments is set as a reception region; and the optical imaging system causes the reflected line beams split by the beam splitting mechanism to form images on the reception regions in the different segments, respectively, on the receiving surface of the imaging device.

BRIEF DESCRIPTION OF THE DRAWINGS

FIG. 5A corresponds to a line beam L1 of FIG. 4; FIG. 5B corresponds to a line beam L2 of FIG. 4; FIG. 5C corresponds to a line beam L3 of FIG. 4; FIG. 5D corresponds to a line beam L4 of FIG. 4; and FIG. 5E corresponds to a line beam L5 of FIG. 4.

FIGS. 12A to 12O arc explanatory views each schematically showing a state where measured data measured from the object of measurement (bumps 19 c and 19d) shown in FIG. 11 is displayed on a display 14 as a visualized diagram. FIG. 12A shows measured data acquired from a side corresponding to an optical path w1 and an optical path w2.

DETAILED DESCRIPTION OF THE PREFERRED EMBODIMENTS

Hereinafter, embodiments of a measuring apparatus according to an example of the present invention will be described with reference to the drawings.

Figure 1:
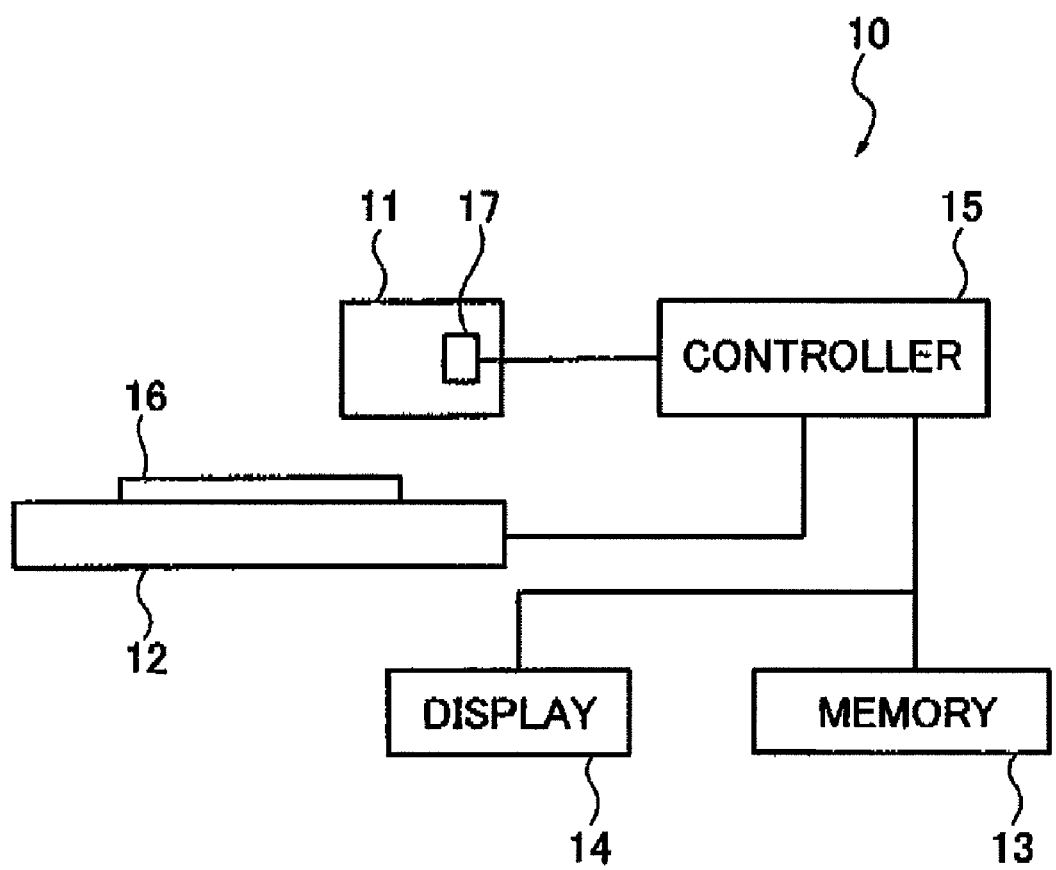
FIG. 1 is a block diagram showing a configuration of a measuring apparatus 10 according to an embodiment of the present invention.
Figure 2:
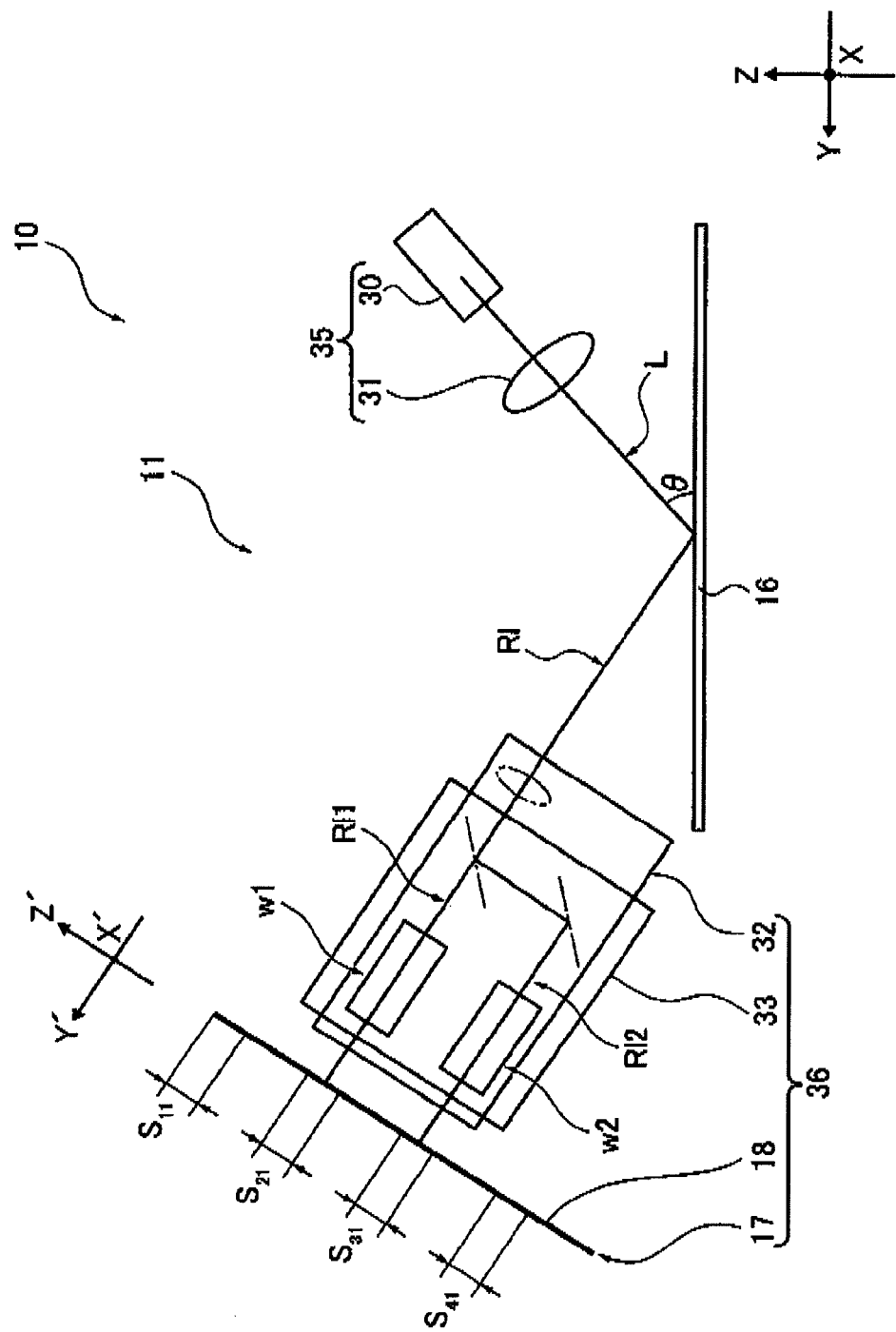
FIG. 2 is an explanatory view schematically showing a relationship between a measurement target (wafer 16) and an optical system 11 in the measuring apparatus 10.
Figure 3:
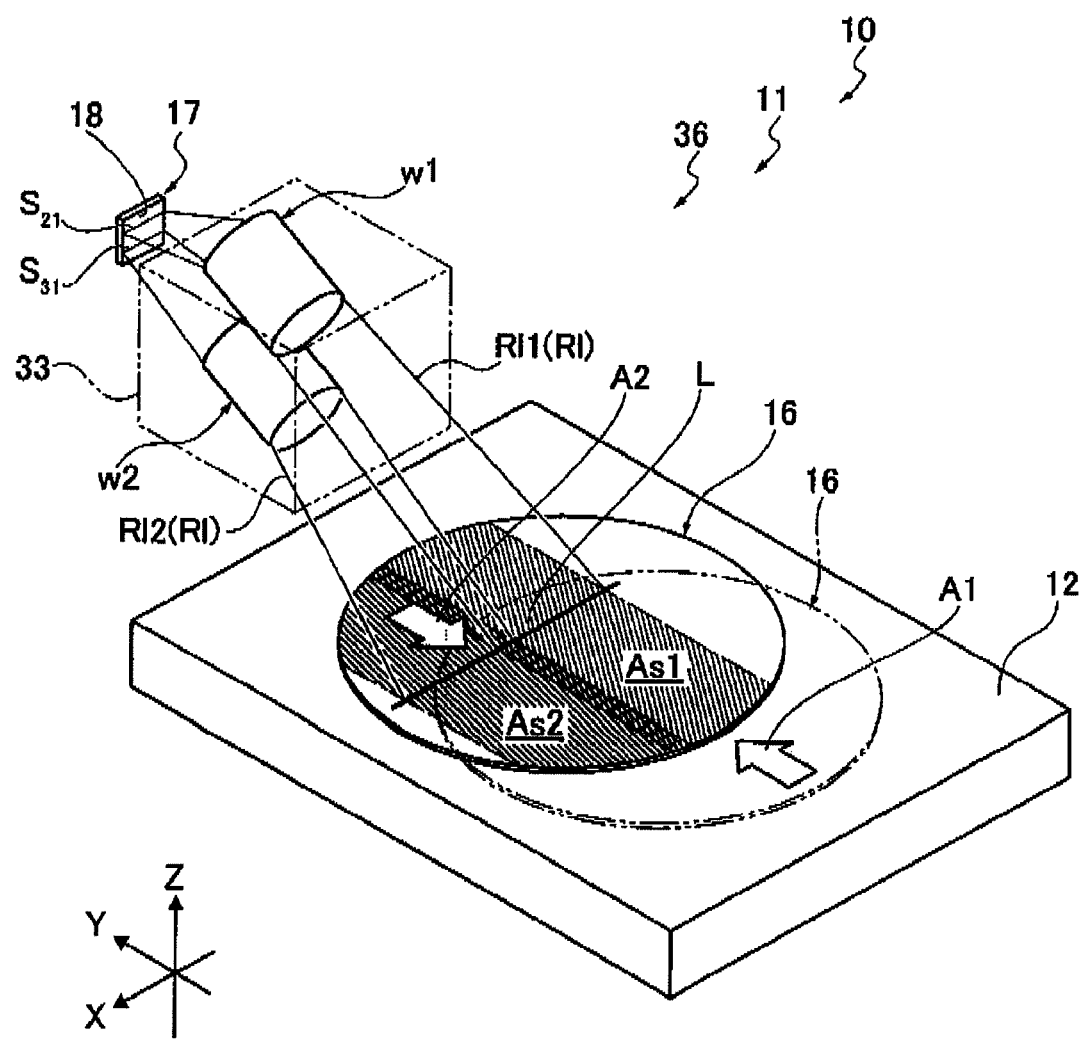
FIG. 3 is a schematic explanatory view for explaining a slide movement of the measurement target (wafer 16) on a stage 12 in the measuring apparatus 10.
Figure 4:
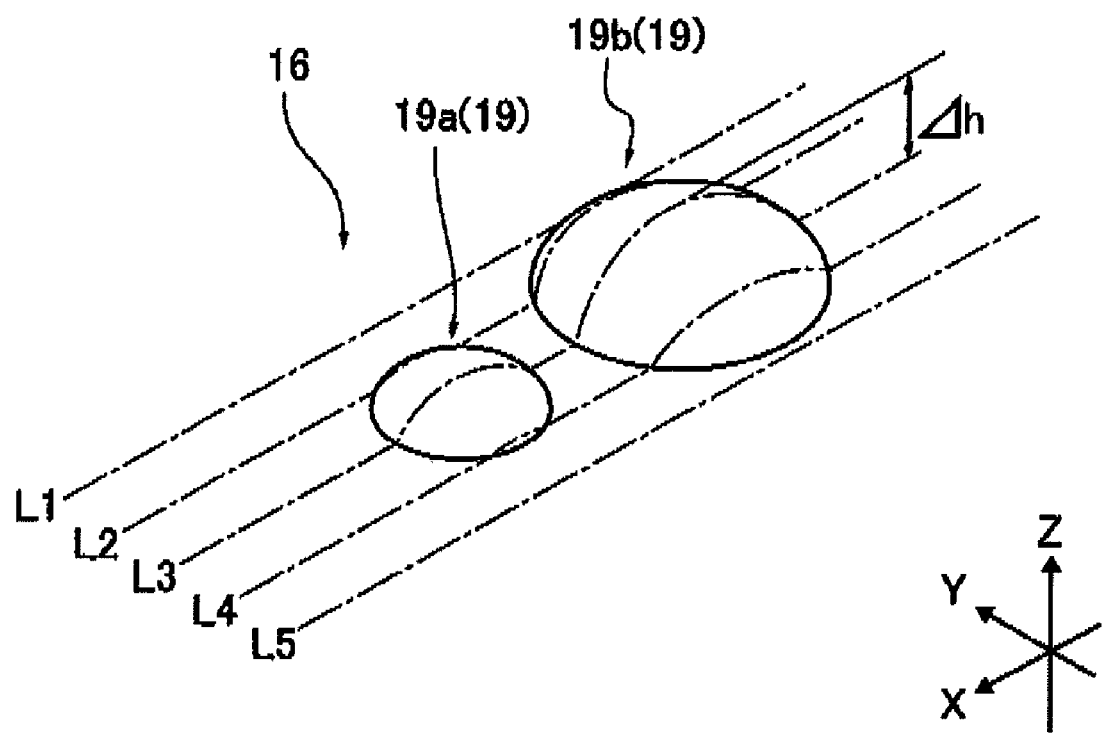
FIG. 4 is an explanatory view schematically showing a relationship between a line beam L and an object for measurement in the measurement target (wafer 16), to explain measurement by the measuring apparatus 10.
Figure 5:
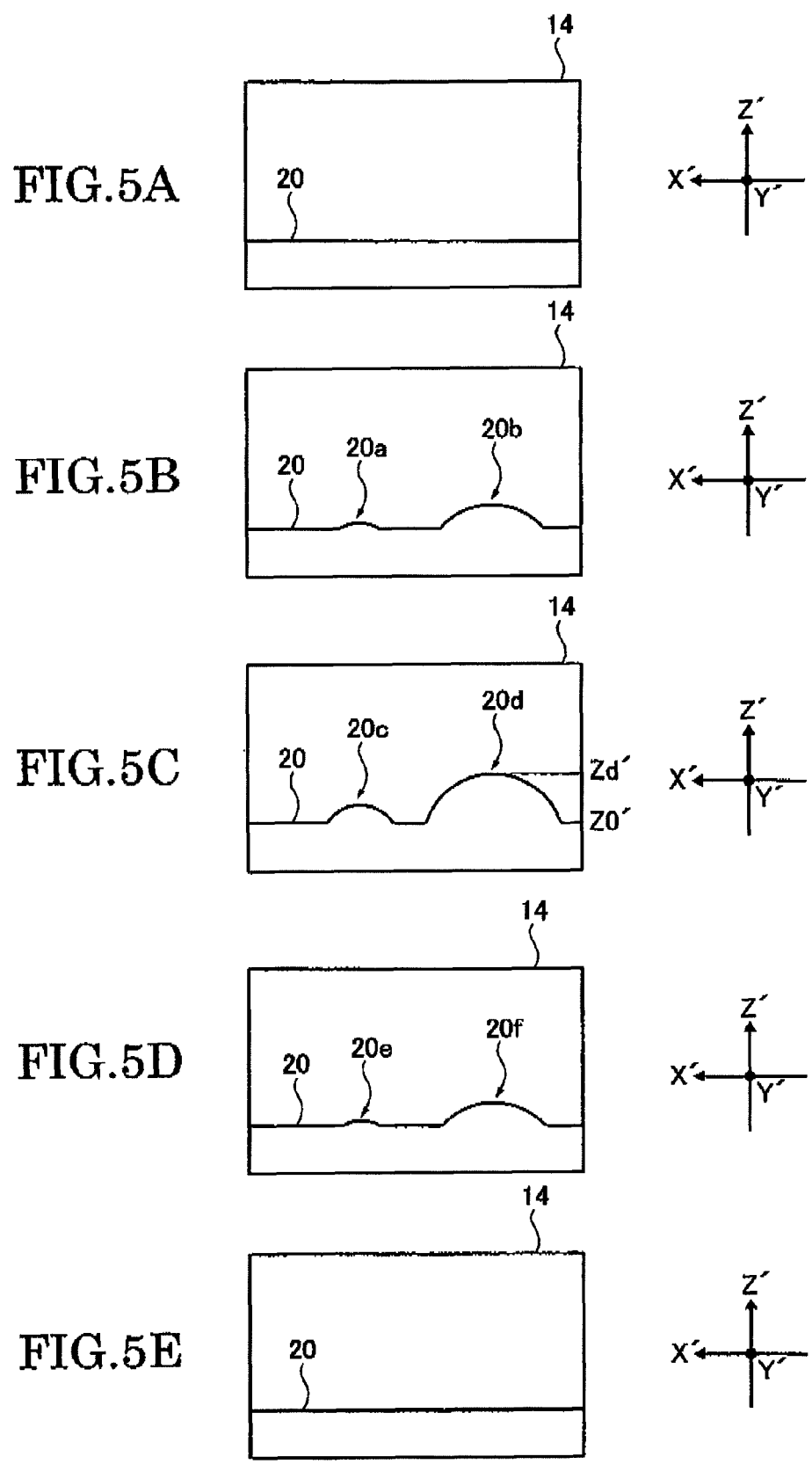
FIGS. 5A to 5E are explanatory views each schematically showing a state where an acquired measurement result is displayed on a display 14 as a visualized diagram.
Figure 6:
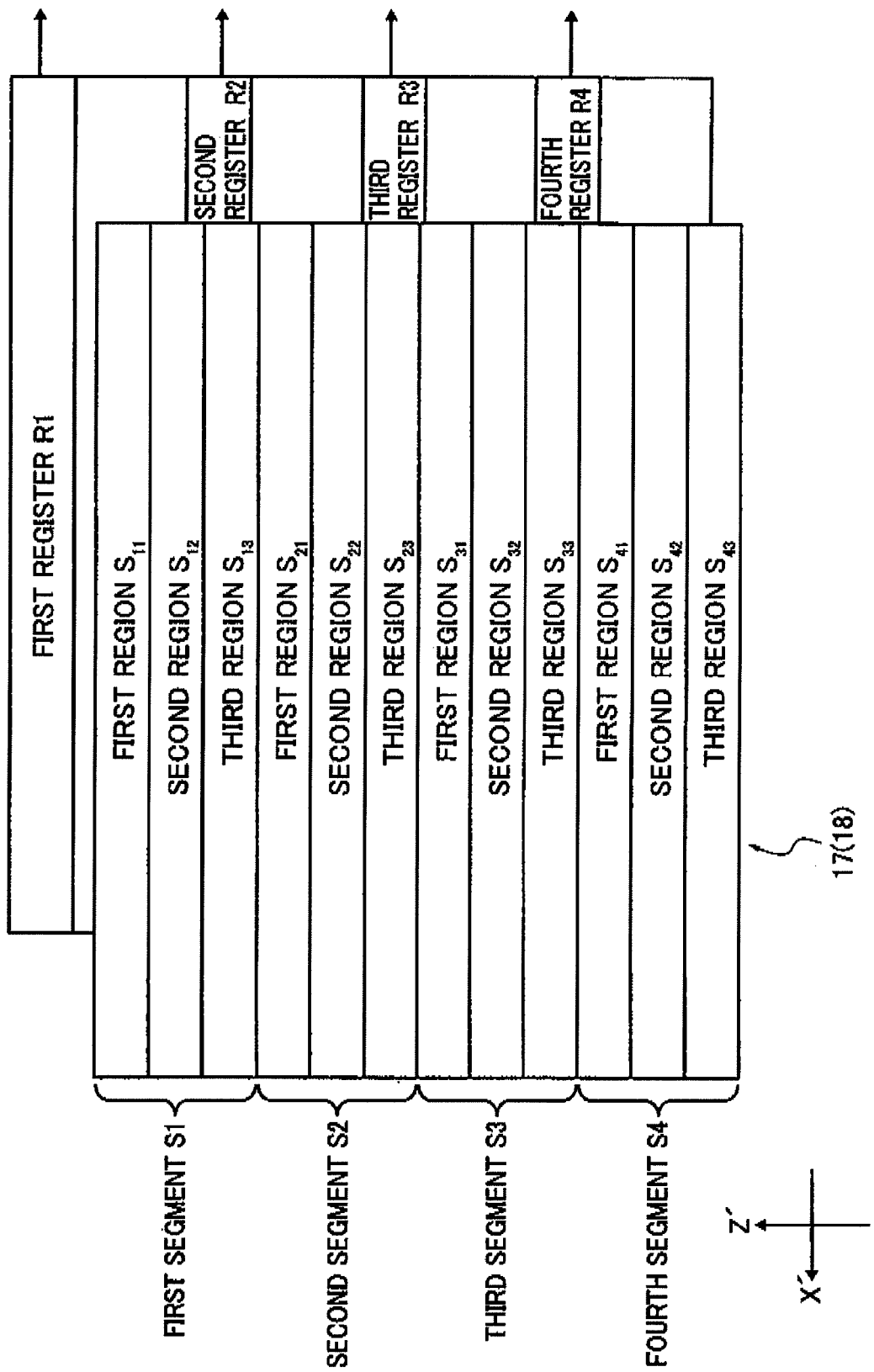
FIG. 6 is an explanatory view for explaining a configuration of an imaging device 17.

Firstly, the concept of the measuring apparatus according to the example of the present invention will be described. FIG. 1 is a block diagram showing a configuration of a measuring apparatus 10 according to the example of the present invention. FIG. 2 is an explanatory view schematically showing a relationship between a measurement target (wafer 16) and an optical system 11 in the measuring apparatus 10. FIG. 3 is a schematic explanatory view for explaining a slide movement of the measurement target (wafer 16) on a stage 12 in the measuring apparatus 10. FIG. 4 is an explanatory view schematically showing a relationship between the line beam L and the object for measurement in the measurement target (wafer 16), to explain measurement by the measuring apparatus 10. FIGS. 5A to 5E are explanatory views each schematically showing a state where an acquired measurement result is displayed on a display 14 as a visualized diagram. FIG. 5A corresponds to a line beam L1 of FIG. 4; FIG. 5B corresponds to a line beam L2 of FIG. 4; FIG. 5C corresponds to a line beam La of FIG. 4; FIG. 5D corresponds to a line beam L4 of FIG. 4; and FIG. 5E corresponds to a line beam L5 of FIG. 4. FIG. 6 is an explanatory view for explaining a configuration of an imaging device 17. Note that in the drawings and in the following description, a mount surface of a stage 12 is denoted by an X-Y plane, a direction intersecting the X-Y plane is denoted by a direction Z, and a direction in which the measurement target (wafer 16) mounted on the stage 12 is slid is denoted by a direction Y. In addition, on a receiving surface 18 of the imaging device 17, directions corresponding to the directions X and Z on the stage 12 are denoted by directions X' and Z', respectively, and a direction intersecting an X'-Z' plane is denoted by a direction Y'.

The measuring apparatus 10 according to the example of the present invention carries out a measuring method employing an optical lever scheme in which a single line beam is radiated. As the basic concept, the measuring apparatus 10 aims to simultaneously acquire multiple pieces of measured information (measured data) without elongating the measuring time. In the apparatus, a projection optical system radiates a line beam on a measurement target, an imaging device of a reception optical system acquires a reflected line beam reflected from the measurement target, and the surface shape of the measurement target is measured on the basis of the geometric positional relationship in the reflected line beam on the measurement target. The reception optical system employs an imaging device whose receiving surface is set to have multiple segments. To acquire the shape of the line beam on the measurement target, the reflected line beam is split, and the split reflected line beams are caused to form images on different segments on the receiving surface of the imaging device. To be more specific, by using the measuring apparatus 10, multiple pieces of measured information (measured data) whose optical settings for the object of measurement in the measurement target differ from one another can be acquired simultaneously without increasing time required for the measurement. As shown in FIG. 1, the measuring apparatus 10 includes the optical system 11, the stage 12, a memory 13, the display 14 and a controller 15.

As shown in FIG. 2, in the optical system 11, a projection optical system 35 radiates a line beam L that extends in the direction X (see FIG. 3) on a later-mentioned measurement target (later-mentioned wafer 16) mounted on the stage 12. A reception optical system 36 enables acquisition of the shape of the line beam L on the measurement target by causing the reflected line beam R11 to form images on predetermined regions (later-described reception regions) on the receiving surface 18 of the imaging device 17, the reflected line beam R11 being light reflected from the measurement target having been irradiated with the line beam L on a surface thereof. In the optical system 11, the imaging device 17 acquires information necessary for measuring the shape of the line beam L on the surface of the measurement target, that is, the surface shape of the measurement target (or its position coordinate) along the line beam L. The imaging device 17 acquires the information on the basis of the geometric positional relationship in the line beam L on the measurement target. A configuration of the optical system 11 will be described later.

As shown in FIG. 3, the stage 12 is provided to slide the mounted measurement target in the direction Y to change a position on the measurement target at which the projection optical system 35 (see FIG. 2) radiates the line beam L. In this example, the wafer 16 is mounted on the stage 12 as the measurement target. Some types of wafers 16 are provided with ball-shaped terminals (referred to below as bumps 19 (see FIG. 4)) formed by soldering or the like to provide wiring for each electronic component to be generated from the wafer, and the height of each of the bumps 19 needs to be managed for quality management of each of the electronic components. For this reason, the object to be measured in this example is the bump 19 (height of the bump) provided in the wafer 16.

If the wafer 16 is moved in the direction Y (see arrow A1) on the stage 12, the position on the wafer 16 (surface of the wafer 16) irradiated with the line beam L shifts in the direction opposite to the movement direction A1 (see arrow A2). Accordingly, when the wafer 16 is mounted on the stage 12, the wafer 16 can be irradiated at a region having a width equal to the width of the line beam L and extending in the direction Y. Along with the radiation, the reception optical system 36 appropriately acquires a reflected line beam R1, and thus measurement (scanning) can be carried out for a region obtained by extending, in the direction Y, an area which is irradiated with the line beam L and is targeted for acquisition of the reflected line beam R1 (referred to below as acquisition regions (see numerals As1 and As2)).

Thus, the measuring apparatus 10 is capable of measuring the entire region of the wafer 16 in the following manner. Specifically, the above measuring operation (scanning) is repeated while the area irradiated with the line beam L (in the direction X) and targeted for acquisition of the reflected line beam R1 by the reception optical system 36 is being changed in the X direction relative to the position of the wafer 16 mounted on the stage 12. Under control of the controller 15, the stage 12 sets a speed for moving the wafer 16 according to intervals of measurement positions in the direction Y of the wafer 16 and processing speed of the imaging device 17, and slides the wafer 16 at this speed.

According to control performed by the controller 15, each piece of measured data based on an electrical signal (each piece of pixel data) outputted from the imaging device 17 is appropriately stored to and read from the memory 13. Under control of the controller 15, the display 14 displays each piece of measured data stored in the memory 13 as a numerical value or a visualized diagram (see FIGS. 5A to 5E).

The controller 15 sets the speed for sliding the wafer 16 according to intervals of measurement positions in the direction Y of the wafer 16 (measurement target) and processing speed of the imaging device 17. The controller 15 then outputs a drive signal to the stage 12 to drive the stage 12 at this speed, as well as outputs, to the imaging device 17, a signal for outputting an electrical signal (each piece of pixel data) synchronized with the sliding movement. In addition, the controller 15 converts an electrical signal (each piece of pixel data) outputted from the imaging device 17 into a shape of the line beam L on the surface of the measurement target, that is, into measured data as a position coordinate of the measurement target on the line beam L. The controller 15 carries out this conversion on the basis of a geometric positional relationship in the line beam L on the measurement target. Moreover, the controller 15 reads out measured data stored in the memory 13 at an appropriate timing, and causes the display 14 to display the data as a numerical value or a visualized diagram (see FIGS. 5A to 5E).

The controller 15 is capable of carrying out three-dimensional measurement of the wafer 16 by sliding the wafer 16 on the stage 12 at the predetermined speed, and generating measured data on the basis of the electrical signal (each piece of pixel data) outputted from the imaging device 17 after passing through the optical system 11. A description will be given below of an example of a diagram obtained by visualizing measured data.

Firstly, as shown in FIG. 4, assuming that two of the bumps 19 (referred to below as bumps 19a and 19b) are provided on the wafer 16 being the measurement target, if the wafer 16 is slid in the direction Y on the stage 12, the part being irradiated with the line beam L relatively moves from reference numeral L1 to reference numeral L5. As a result, pieces of measured data acquired by way of the reception optical system 36 of the optical system 11 are as follows. Specifically, as shown in FIG. 5A, measured data corresponding to a line beam L1 is a flat line 20 including no variation in the direction Z' on any point in the direction X'; as shown in FIG. 5B, measured data corresponding to a line beam L2 is the line 20 including a small protrusion 20a corresponding to the shape of an intermediate part of the bump 19a, and a protrusion 20b corresponding to the shape of an intermediate part of the bump 19b; as shown in FIG. 5C, measured data corresponding to a line beam L3 is the line 20 including a protrusion 20c corresponding to the shape of the peak of the bump 19a, and a large protrusion 20d corresponding to the shape of the peak of the bump 19b; as shown in FIG. 5D, measured data corresponding to a line beam L4 is the line 20 including a small protrusion 20e corresponding to the shape of an intermediate part of the bump 19a, and a protrusion 20f corresponding to the shape of an intermediate part of the bump 19b; and as shown in FIG. 5E, measured data corresponding to a line beam L5 is the flat line 20. Thus, by sliding the measurement target (wafer 16) on the stage 12 at a predetermined speed and appropriately generating measured data on the basis of the electrical signal (each piece of pixel data) outputted from the imaging device 17 by way of the optical system 11, three dimensional measurement of the measurement target can be carried out, and measured data can be displayed on the display 14 as a visualized diagram. Note that measured data as a numerical value is obtained by combining numeric data of each point (X', Z' coordinates) in the visualized diagram with numeric data of the sliding position of the measurement target (wafer 16) (in the direction Y) on the stage 12. Here, by using the coordinate position in the direction Z' (height) on the receiving surface 18 of the imaging device 17, the height of the measurement target (wafer 16) on the stage 12 in the direction Z can be represented by the following equation (1). Here, in the equation (1), the height of the bump 19b is $\Delta h$ (see FIG. 4), the position coordinate of the peak of the bump 19b on the receiving surface 18 is Zd' (see FIG. 5C), the position coordinate of the flat part of the measurement target on the receiving surface 18 is Z0' (see FIG. 5C), the incident angle at which the line beam L radiated from the projection optical system 35 is incident on the measurement target (wafer 16) on the stage 12 is $\theta$ (see FIG. 2), and the magnification of an optical imaging system (32) in the direction Z (direction Z') is set to 1.

$$\Delta h = 2(Zd' - Z0')\sin\theta \quad (1)$$

Thus, the height of the measurement target (wafer 16) on the stage 12 in the direction Z can be obtained from the coordinate position on the receiving surface 18.

Next, a configuration of the optical system 11 will be described. As shown in FIG. 2, the optical system 11 includes a light source 30, a collimating lens 31, the optical imaging system 32, a beam splitting mechanism 33 and the imaging device 17.

The light source 30 emits a light beam for the line, beam L, and may be formed of a laser diode or the like, for example. The collimating lens 31 converts a light beam emitted from the light source 30 into the line beam L (see FIG. 3 and other drawings) that radiates the wafer 16 (measurement target) in a linear form having a predetermined width (in the direction X). A cylindrical lens or the like may be used as the collimating lens, for example. Hence, in the optical system 11, the light source 30 and the collimating lens 31 form the projection optical system 35.

In the optical imaging system 32, the reflected light R1 reflected from the wafer 16 (measurement target) is caused to form an image on the receiving surface 18 of the imaging device 17, so that the shape of the line beam L on the surface of the wafer 16 can be measured, that is, the measurement target (position coordinate of the target) can be measured along the line beam L. Here, the reflected line beam R1 refers to that including information on the shape of the line beam L (see FIG. 4) on the wafer 16 (measurement target). The optical imaging system 32 may be appropriately configured by use of various lenses depending on the relationship between geometric positions of the wafer 16 mounted on the stage 12 (the line beam L radiated thereon) and the receiving surface 18 of the imaging device 17.

The beam splitting mechanism 33 splits the reflected line beam R1 into two (one is referred to as R11 and the other is referred to as R12), so that shapes of the line beam L on measurement positions on the wafer 16 (measurement target) that differ from one another in the extending direction of the line beam L can be acquired through the imaging device 17. A half mirror or a wavelength separation mirror may be used as the beam splitting mechanism 33, for example. Hence, in the optical system 11, the optical imaging system 32, the beam splitting mechanism 33 and the imaging device 17 form the reception optical system 36.

In the beam splitting mechanism 33, a first optical path w1 that serves as an optical path for the first reflected line beam R11, and a second optical path w2 that serves as an optical path for the second reflected line beam R12 are provided. As will be described later, the first optical path w1 and the second optical path w2 are provided to cause the first reflected line beam R11 and the second reflected line beam R12 to form images on first regions ($S_{11}$ to $S_{41}$) (see FIG. 6) of different segments Sn (n=1 to 4) set on the receiving surface 18 of the imaging device 17. In addition, the first optical path w1 and the second optical path w2 have different optical settings made therein for the object for measurement (each bump 19 in the above example) in the measurement target, as seen on the receiving surface 18 (each of the first regions ($S_{11}$ to $S_{41}$) being the reception region) of the imaging device 17. Since the apparatus aims to increase the inspection speed, the optical setting refers to the position (referred to below as measurement position) within the extending direction of the line beam L (in the direction X) in the measurement target (wafer 16) mounted on the stage 12, the position targeted for acquisition of measured data. In the measuring apparatus 10, the direction in which the measurement target (wafer 16) mounted on the stage 12 is scanned by the sliding movement is the direction Y, and thus the range to be measured by a single scanning operation (measuring movement) is limited by the acquisition range of the imaging device 17 in the direction X (width). Accordingly, if different positions are set on the line beam L for the first optical path w1 and the second optical path w2 for acquisition of measured data, the number of times of scanning can be reduced by half when other conditions (measurable range (magnification) of the object of measurement in the measurement target and/or resolution for the measurement target or the like) are set to be the same. Consequently, the overall inspection speed (throughput) can be improved.

Here, the measurable range (magnification) of the object of measurement indicates the measurable range of the measurement target (wafer 16) mounted on the stage 12 in terms of the size in the direction Z. This range can be represented as the size of the measurement target (wafer 16) in the direction Z on the stage 12 corresponding to the size thereof in the direction Z' (number of pixels in the direction Z') on the receiving surface 18 (the later described first regions ($S_{11}$ to $S_{41}$) of each of the segments Sn (n=1 to 4)) of the imaging device 17. Meanwhile, the resolution for the measurement target (the object of measurement) indicates the measurement range in the extending direction (in the direction X) of the line beam L on the measurement target (wafer 16) mounted on the stage 12. This range can be represented as the size in the direction X on the stage 12 corresponding to the size in the direction X' (number of pixels in the direction X') on the receiving surface 18 (the first regions ($S_{11}$ to $S_{41}$) of each of the segments Sn (n=1 to 4)) of the imaging device 17.

Note that in this example, the measurement position (the range from which the reflected line beam R1 should be acquired) on the line beam L guided by the first optical path w1 and the measurement position (the range from which the reflected line beam R1 should be acquired) on the line beam L guided by the second optical path w2 are caused to overlap each other within a minute range at their interface. The ranges are caused to overlap each other to prevent a gap to be formed between the two measurement positions due to a manufacturing error or the like.

The imaging device 17 is a solid-state image sensor that converts a subject image formed on the receiving surface 18 into an electrical signal (each piece of pixel data) and outputs the resultant signal. A CMOS image sensor is used as the imaging device 17, for example. The imaging device 17 includes the receiving surface 18 whose entire surface is segmented into latticed regions called pixels, and outputs acquired data formed of a group of pixel data as an electrical signal, each piece of pixel data being digital data. A positional relationship is set in the optical system 11 so that in the imaging device 17, the direction X on the stage 12 corresponds to the horizontal direction (hereinafter referred to as direction X') on the receiving surface 18, and the direction Z on the stage 12 corresponds to the vertical direction (hereinafter referred to as direction Z') on the receiving surface 18. Accordingly, on the receiving surface 18 (the acquired data) of the imaging device 17, the reflected line beam R1 having passed the first optical path w1 or the second optical path w2 basically forms a linear shape extending along the direction X', and the height (in the direction Z) of the measurement target (wafer 16) appears as variation in the imaging position in the direction Z'. In the measuring apparatus 10 according to the present invention, a CMOS image sensor having the following functions is used as the imaging device 17 in order for high-speed image data processing. Note that other sensors (imaging devices) may be employed as long as the sensor has the following functions.

As shown in FIG. 6, in order to achieve high-speed image data processing, multiple segments (reference numerals S1 to S4) are set on the receiving surface 18 of the imaging device 17, multiple registers (reference numerals R1 to R4) are provided to correspond to the segments, and each segment is partitioned into multiple regions. For ease of understanding, the imaging device 17 in the following description has 4 segments (referred to below as first segment S1 to fourth segment S4) and 4 registers (referred to below as first register R1 to fourth register 114) set therein. In addition, each segment Sn (n=1 to 4) is partitioned into 3 regions (referred to as first, second and third regions). Each of the three regions in each segment Sn (n=1 to 4) has the same capacity as each register Rm (m=1 to 4). Each register Rm (m=1 to 4) has a dedicated output path, and in the imaging device 17, signals can be outputted simultaneously from the registers Rm (m=1 to 4).

In each segment Sn (n=1 to 4) of the receiving surface 18 of the imaging device 17, firstly, of the subject image formed on the receiving surface 18, parts of the subject image in the first regions ($S_{11}$ to $S_{41}$) are converted into electrical signals (pieces of pixel data), the electrical signals (pieces of pixel data) are collectively shifted to the corresponding register Rm (m=1 to 4), and the electrical signals (pieces of pixel data) are outputted from each register Rm (m=1 to 4). Then, parts of the subject image in the second regions ($S_{12}$ to $S_{42}$) are converted into electrical signals (pieces of pixel data), the electrical signals (pieces of pixel data) are collectively shifted to the corresponding register Rm (m=1 to 4), and the electrical signals (pieces of pixel data) are outputted from each register Rm (m=1 to 4). Finally, parts of the subject image in the third regions ($S_{13}$ to $S_{43}$) are converted into electrical signals (pieces of pixel data), the electrical signals (pieces of pixel data) are collectively shifted to the corresponding register Rm (m=1 to 4), and the electrical signals (pieces of pixel data) are outputted from each register Rm (m=1 to 4). Thus, in the imaging device 17, circuit configuration can be made simple while naturally increasing the processing speed for outputting the subject image formed on the receiving surface 18 as electrical signals (pieces of pixel data).

Additionally in the imaging device 17, according to control performed by the controller 15, electrical signals (pieces of pixel data) from the first regions ($S_{11}$ to $S_{41}$) of the segments Sn (n=1 to 4) are outputted through corresponding registers Rm (m=1 to 4), and electrical signals (pieces of pixel data) from other regions (second and third regions) are caused not to be outputted. Hence, output processing can be performed on acquired data at an even higher speed. Hereinafter, the time required for output processing is referred to as the minimum output processing time of the imaging device 17. In the measuring apparatus 10, lines for partitioning the segments Sn (n=1 to 4) follow the direction X', and lines for partitioning the regions also follow the direction X'. As described above, in the measuring apparatus 10, the direction in which the measurement target (wafer 16) mounted on the stage 12 is scanned by the sliding movement is the direction Y, and thus the range to be measured by a single scanning operation (measuring movement) is limited by the acquisition range of the imaging device 17 in the direction X (width). Hence, as the direction X on the stage 12 corresponds to the direction X' on the receiving surface 18, the range to be measured by a single scanning operation (measuring movement) can be maximized by using the maximum length of the receiving surface 18 in the direction X' for measurement. Since signals can be outputted simultaneously from the registers Rm (M=1 to 4), the imaging device 17 of this example is capable of simultaneously outputting, at most, electrical signals (pieces of pixel data) from the first regions ($S_{11}$ to $5_{41}$) of 4 segments Sn (n=1 to 4) within the same amount of processing time as in the case of outputting from any one single first region, that is, the signals can be outputted simultaneously at the minimum output processing time of the imaging device 17.

With this taken into consideration, the measuring apparatus 10 as an example of the present invention uses the first regions ($S_{11}$ to $S_{41}$) of the segments Sn (n=1 to 4) as the reception regions of the receiving surface 18, and the aforementioned first optical path w1 and the second optical path w2 cause the first reflected line beam R11 and the second reflected line beam R12 to form images on different first regions ($S_{11}$ to $S_{41}$). In this example, as shown in FIG. 2, the first optical path w1 guides the first reflected line beam R11 to the first region $S_{23}$ of the second segment S2, and the second optical path w2 guides the second reflected line beam R12 to the first region $S_{31}$ of the third segment S3. Note that the regions in the segments Sn (n=1 to 4) are examples for ease of understanding and do not necessarily correspond to the positional relationship on an actual receiving surface of the imaging device. However, as described above, each of the regions in the segments Sn (n=1 to 4) extend over the whole width of the receiving surface 18 of the imaging device 17 in the direction X'. Accordingly, in the measuring apparatus 10, the whole width of each region in the segments Sn (n=1 to 4) can be used for measurement on the receiving surface 18 of the imaging device 17.

In the measuring apparatus 10, when the line beam L emitted from the projection optical system 35 is radiated on the wafer 16 (measurement target) which is mounted on the stage 12 to be appropriately slid, the reflected line beam R1 reflected therefrom is split by the beam splitting mechanism 33 while being optically adjusted by the optical imaging system 32. The first reflected line beam R11 being one of the split beam passes the first optical path w1 and is caused to form an image on the first region $S_{21}$ in the second segment S2 on the receiving surface 18 of the imaging device 17, and the second reflected line beam R12 being the other one of the split beam passes the second optical path w2 and is caused to form an image on the first region $S_{31}$ in the third segment S3 on the receiving surface 18 of the imaging device 17. Under control of the controller 15, the imaging device 17 outputs, to the controller 15, electrical signals (pieces of pixel data) corresponding to the imaged first reflected line beam R11 through the second register R2 which corresponds to the first region $S_{21}$ of the second segment S2. Under control of the controller 15, the imaging device 17 also outputs, to the controller 15, electrical signals (pieces of pixel data) corresponding to the imaged second reflected line beam R12 through the third register R3 which corresponds to the first region $S_{31}$ of the third segment S3. At this time, the output from the second register R2 corresponding to the first region $S_{21}$ and the output from the third register R3 corresponding to the first region $S_{31}$ are performed simultaneously, and the amount of time required for processing thereof is the same as the minimum output processing time of the imaging device 17.

Accordingly, in the measuring apparatus 10 of the present invention, only the minimum output processing time of the imaging device 17 is required for outputting, to the controller 15, two kinds of electrical signals (pieces of pixel data) which are: the electrical signals (pieces of pixel data) corresponding to the first reflected line beam R11 having passed the first optical path w1; and the electrical signals (pieces of pixel data) corresponding to the second reflected line beam R12 having passed the second optical path w2. Here, with the first reflected line beam R11 having passed the first optical path w1 and the second reflected line beam R12 having passed the second optical path w2, measured data can be acquired from different measurement positions which are adjacent to each other on the line beam L radiated on the measurement target (wafer 16) mounted on the stage 12. Consequently, measured data for approximately 2 scanning operations (measuring movements) can be acquired from a single scanning operation. Thus, the overall inspection speed (throughput) can be improved.

Incidentally, although in this example the measuring apparatus 10 is configured so that the reflected line beam R1 is split into two (first optical path w1 and second optical path w2) in the beam splitting mechanism 33, the number into which the reflected line beam R1 is split can be increased up to the number of segments set in the imaging device (on its receiving surface). In this case, the measuring apparatus 10 may be configured so that an optical path is provided for each reflected line beam R1 according to the number into which the reflected line beam R1 is split, and cause the reflected line beams R1 to form images on different regions (the first regions in the segments Sn (n=1 to 4) in the above example) on the receiving surface of the imaging device. Although the reflected line beam R1 is split into two in the following examples (including Modified Example 1) for ease of understanding, the number into which the reflected line beam R1 is split may be increased up to the number of segments set in the imaging device (on its receiving surface), as in the case of this example.

Moreover, although in the above example, an exemplar imaging device 17 in which 4 segments are set is shown and each segment is partitioned into 3 regions on the receiving surface 18, the invention is not limited to this, and the following examples may also be employed, Specifically, the imaging device 17 may otherwise be: a CMOS sensor in which 16 segments are set, each segment being partitioned into 8 regions; a CMOS sensor in which 12 segments are set, each segment being partitioned into 4 regions; a CMOS sensor in which 16 segments are set, each segment being partitioned into 4 regions; or the like.

Furthermore, in the above example, the first region of each segment is used as the reception region on the receiving surface 18. The measuring apparatus 10 according to the present invention employs the imaging device 17 in which multiple segments are set and which has the above-mentioned functions, and thus even when all of the regions in the segment are used as the reception regions on the receiving surface 18, the output processing can be performed much faster than in a case of employing an imaging device not having the above-mentioned functions. Hence, all of the regions in the segment may be used as the reception regions on the receiving surface 18, or an arbitrary number of regions in the segment may be used as the reception regions on the receiving surface 18.

In addition, in the above example, the first region of each segment is used as the reception region on the receiving surface 18. However, when an electrical signal (each piece of pixel data) from the second region of each segment is used while not outputting electrical signals (pieces of pixel data) from the other regions (first and third regions), for example, the output processing can be performed in approximately the same amount of time as in the case of using only the first region of each segment. For this reason, any of the regions in the segment may be used as the reception region on the receiving surface 18. Accordingly, as mentioned above, in the case of using a certain number of regions in the segment as the reception regions in the receiving surface 18, any one or more of the regions may be used as the reception regions regardless of the order of the regions from which the signals are read from the corresponding register.

EXAMPLE 1

Figure 7:
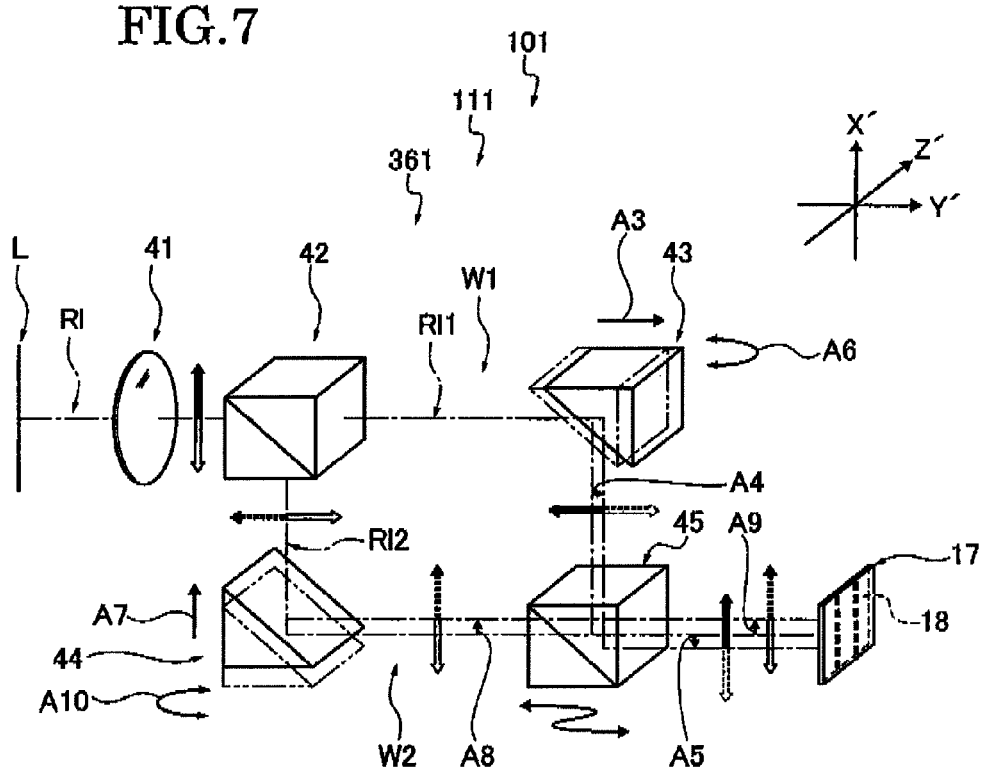
FIG. 7 is a configuration diagram schematically showing a reception optical system 361 in an optical system 111.
Figures 8A, 8B, 8C:
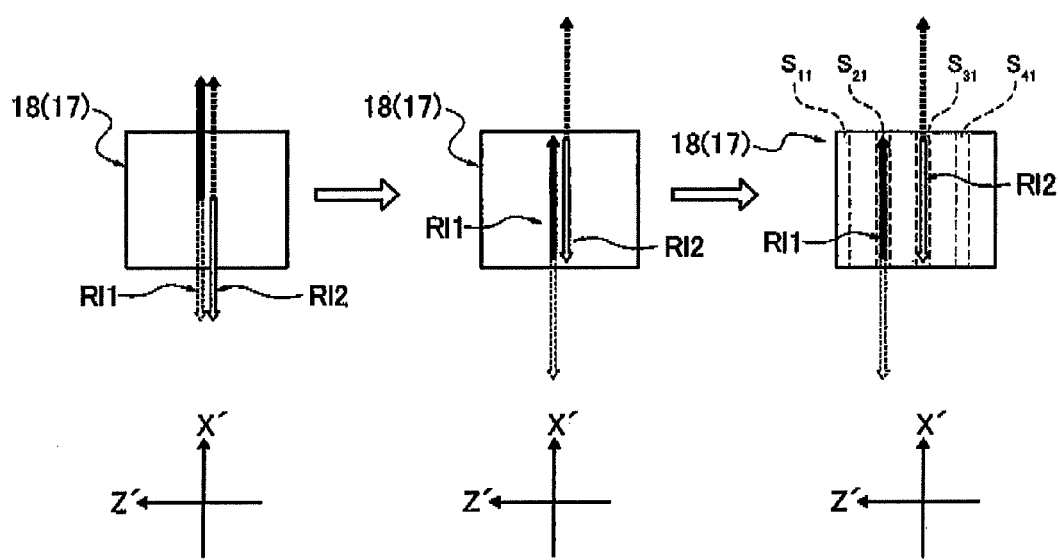
FIGS. 8A to 8C are explanatory views for describing a state of varying only the measurement position of the measurement target in the reception optical system 361 (beam splitting mechanism 33).

Next, a description will be given of a measuring apparatus 101 of Example 1 which is an example of a specific configuration of a reception optical system 361 in the measuring apparatus according to the present invention. Note that since basic configuration of the measuring apparatus 101 of Example 1 is the same as the measuring apparatus 10 described in the above example, parts having the same configuration are assigned the same reference numerals, and details thereof are omitted. FIG. 7 is a configuration diagram schematically showing the reception optical system 361 in an optical system 111. FIGS. 8A to 8C are explanatory drawings for describing a state of varying only the measurement position of the measurement target in the reception optical system 361 (beam splitting mechanism 33).

In the optical system 111 in the measuring apparatus 101 of Example 1, a projection optical system 351 includes a light source 30 and a collimating lens 31 (see FIG. 2) as in the above example. Thus, in the measuring apparatus 101, a beam having a single wavelength emitted from a single light source 30 is referred to as a line beam L, and is radiated on a wafer 16 (measurement target) mounted on a stage 12.

The reception optical system 361 in the optical system 111 includes a lens 41, a splitting prism 42, a first reflecting prism 48, a second reflecting prism 44, a combining prism 45 and an imaging device 17.

The lens 41 is optically set according to the positional relationship between the wafer 16 mounted on the stage 12 and a receiving surface 18 of the imaging device 17, so that the measurable range (magnification) of the object of measurement in the measurement target and the resolution for the measurement target are appropriately set. Here, appropriate setting refers to making the measuring time as short as possible while maintaining a certain accuracy.

The splitting prism 42 splits into two a beam (reflected line beam R1) having been reflected from the wafer 16 and passed the lens 41. In Example 1, a half mirror is employed since the line beam L is formed of a single wavelength. The splitting prism 42 splits the beam (reflected line beam R1) having been reflected from the wafer 16 and proceeding in a direction Y' into two paths including a first optical path w1 that causes the beam to proceed straight ahead, and a second optical path w2 that causes the beam to proceed in a direction orthogonal to the direction Y' (negative side of direction X' in this example). In the following description, the reflected line beam R1 passing through the first optical path w1 is referred to as a first reflected line beam R11, and the reflected line beam R1 passing through the second optical path w2 is referred to as a second reflected line beam R12.

The first reflecting prism 43 and the combining prism 45 are provided in the first optical path w1. In the first optical path w1, the first reflected line beam R11 having passed through the splitting prism 42 proceeds to the first reflecting prism 43, and is reflected by the first reflecting prism 43 to proceed in the direction orthogonal to the direction Y' (negative side of direction X' in this example), and then enters the combining prism 45.

Meanwhile, the second reflecting prism 44 and the combining prism 45 are provided in the second optical path w2. In the second optical path w2, the second reflected line beam R12 reflected by the splitting prism 42 proceeds to the second reflecting prism 44, and is reflected by the second reflecting prism 44 to proceed in the direction Y', and then enters the combining prism 45. Here, in the reception optical system 361, the path lengths of the first optical path w1 and the second optical path w2 before entering the combining prism 45, that is, the path lengths leading to the receiving surface 18 of the imaging device 17 are the same.

The combining prism 45 causes the first reflected line beam 1111 having passed the first optical path w1 and the second reflected line beam R12 having passed the second optical path w2 to proceed in the direction Y' extremely closely to each other, and guides the lines to different reception regions on the receiving surface 18 of the imaging device 17. Here, the reception regions refer to regions in each of the segments used to acquire the reflected line beam R1 (the electrical signal (each piece of pixel data) of the reflected line beam R1) on the receiving surface of the imaging device 17, that is, at least one or more regions into which each segment is partitioned, and are appropriately set according to requirements in the overall inspection speed (throughput) and the inspection accuracy, while considering the output processing time of the imaging device 17. In this example, in order for high speed (the minimum output processing time of the imaging device 17) and simultaneous processing to be performed in the imaging device 17, regions for which transfer processing is firstly performed in the segments on the receiving surface of the imaging device are set as the reception regions, and in the receiving surface 18 of the imaging device 17 in the above example, any of the first regions ($S_{11}$ to $S_{41}$) in the segments Sn (n=1 to 4) are set as the reception regions. In Example 1, the first reflected line beam R11 having passed the first optical path w1 is reflected, in the direction Y' to be guided to the first region $S_{21}$ of the second segment S2 on the receiving surface 18 of the imaging device 17, and the second reflected line beam R12 having passed the second optical path w2 is passed through to be guided to the first region $S_{31}$ of the third segment S3 on the receiving surface 18 of the imaging device 17. A half mirror is used as this combining prism 45.

The reception optical system 361 of Example 1 is configured so that what is different between the first reflected line beam R11 having passed the first optical path w1 and the second reflected line beam R12 having passed the second optical path w2, is only the measurement position of the measurement target. Hereinbelow, this configuration will be described by use of FIGS. 7 and 8A to 8C. In the reflected line beam R1 in FIGS. 7 and 8A to 8C, the acquisition target extending in one direction from the optic axis of the reception optical system 361 is indicated by a black arrow, and the acquisition target extending in the other direction is indicated by a hollow arrow. The one acquisition target (black arrow) and the other acquisition target (hollow arrow) correspond to one side and the other side of the optic axis of the reception optical system 361 on the line beam L. Additionally, in the reflected line beam R1 in FIGS. 7 and 8A to 8C, one acquisition target (black arrow) is used (acquired by the imaging device 17) in the first reflected line beam R11 having passed the first optical path w1, and the other acquisition target (hollow arrow) is used (acquired by the imaging device 17) in the second reflected line beam R12 having passed the second optical path w2, as will be described later. For this reason, the side to be used in each of the reflected line beams R1 is indicated by a solid line, and the other side is indicated by a broken line.

In the reception optical system 361, the path lengths of the first optical path w1 and the second optical path w2 are set to be the same. Accordingly, after passing through the lens 41, the first reflected line beam R11 having passed the first optical path w1 and the second reflected line beam R12 having passed the second optical path w2, have the same measurable range (magnification) of the object of measurement in the measurement target and the same resolution for the measurement target when seen on the receiving surface 18 of the imaging device 17. Thus, the reception optical system 361, as a whole, forms an optical imaging system 32.

Firstly, if the first reflecting prism 43 and the second reflecting prism 44 are provided at positions indicated by the two-dot chain line in the reception optical system 361, the optic axes of all of the components are set to coincide with one another. In this case, the first reflected line beam R11 having passed through the lens 41, been split by the splitting prism 42 and passed the first optical path w1, and the second reflected line beam R12 similarly having been split by the splitting prism 42 and passed the second optical path w2 are caused to form images on the same part on the receiving surface 18 of the imaging device 17, the images overlapping each other completely (see FIG. 8A). In other words, an intermediate position (border between the black arrow and the hollow arrow) in the direction X' of the first reflected line beam R11 and that of the second reflected line beam R12 are positioned at the center of the receiving surface 18. Note that although in FIGS. 8A and 8B, the first reflected line beam R11 and the second reflected line beam R12 are arranged next to each other (shifted) in the direction Z' for ease of understanding, in actuality, the two overlap each other completely in the direction Z'.

From this state, if the first reflecting prism 43 is moved to the positive side in the direction Y' (see arrow A3) as in FIG. 7, the position of the first reflected line beam R11 between the first reflecting prism 43 and the combining prism 45 is shifted to the positive side in the direction Y' (see arrow A4). At the same time, the position of the first reflected line beam R11 between the combining prism 45 and the imaging device 17 is shifted to the negative side in the direction X' (see arrow A5). Then, when seen on the receiving surface 18, the first reflected line beam R11 is shifted from the center of the receiving surface 18 (see FIG. 8A) to the negative side in the direction X'. Thus, if the first reflecting prism 43 is moved to a predetermined position in the direction Y' (from the position indicated by the two-dot chain line to the position indicated by the solid line), the center of one measurement position (black arrow) in the first reflected line beam R11 is shifted to the center of the receiving surface 18 (see FIG. 8B).

Thereafter, if the first reflecting prism 43 is rotated in the right direction (the drawing being viewed from the front side) about an axis penetrating the center of the first reflecting prism 43 along the direction X' (see arrow AG), the first reflected line beam R11 between the first reflecting prism 43 and the combining prism 45 inclines toward the positive side in the direction Z' as the first reflected line beam R11 proceeds to the negative side in the direction X'. Then, the first reflected line beam R11 between the combining prism 45 and the imaging device 17 inclines toward the positive side in the direction Z' as the first reflected line beam R11 proceeds to the positive side in the direction Y'. When seen on the receiving surface 18, from the state where the center of one measurement position (black arrow) of the first reflected line beam R11 is positioned at the center of the receiving surface 18 (see FIG. 8B), the first reflected line beam R11 is shifted to the positive side in the Z' direction. Thus, the first reflecting prism 43 is rotated about an axis extending in the direction X' to a predetermined position, so that one measurement position (black arrow) is shifted to the first region $S_{21}$ of the second segment S2 on the receiving surface 18 (see FIG. 8C). With this, the first reflected line beam R11 having passed the first optical path w1 is caused to form an image on the first region $S_{21}$ of the second segment S2. Note that the shifting in the direction Y' and rotating about an axis extending in the direction X' of the first reflecting prism 43 may be performed in any order, and is not limited to Example 1. In addition, although in Example 1 the first reflecting prism 43 is rotated in the right direction to cause the first reflected line beam R11 to be shifted from the center to the positive side in the direction Z', it goes without saying that the direction in which to rotate the first reflecting prism 43 about an axis extending in the direction X' may be determined according to the shift direction (on which reception region to form an image on the receiving surface 18).

Similarly, if the second reflecting prism 44 is moved to the positive side in the direction X' (see arrow A7), the position of the second reflected line beam R12 between the second reflecting prism 44 and the combining prism 45 is shifted to the positive side in the direction X' (see arrow A8). Then, the position of the second reflected line beam R12 between the combining prism 45 and the imaging device 17 is shifted to the positive side in the direction X' (see arrow A9). When seen on the receiving surface 18, the second reflected line beam R12 is shifted from the center of the receiving surface 18 (see FIG. 8A) to the positive side in the direction X'. Thus, if the second reflecting prism 44 is moved to a predetermined position in the direction X' (from the position indicated by the two-dot chain line to the position indicated by the solid line), the center of the other measurement position (hollow arrow) in the second reflected line beam R12 is shifted to the center of the receiving surface 18 (see FIG. 8B).

Thereafter, if the second reflecting prism 44 is rotated in the right direction (the drawing being viewed from the front side) about an axis penetrating the center of the second reflecting prism 44 along the direction X' (see arrow A10), the second reflected line beam R12 between the second reflecting prism 44 and the combining prism 45 inclines toward the negative side in the direction Z' as the second reflected line beam R12 proceeds to the positive side in the direction Y'. Then, the second reflected line beam R12 between the combining prism 45 and the imaging device 17 inclines toward the negative side in the direction Z' as the second reflected line beam R12 proceeds to the positive side in the direction Y'. When seen on the receiving surface 18, from the state where the center of the other measurement position (hollow arrow) of the second reflected line beam R12 is positioned at the center of the receiving surface 18 (see FIG. 8B), the second reflected line beam R12 is shifted to the negative side in the Z' direction. Thus, the second reflecting prism 44 is rotated about an axis extending in the direction X' to a predetermined position, so that the other measurement position (hollow arrow) is shifted to the first region $S_{31}$ of the third segment S3 on the receiving surface 18 (see FIG. 8C). With this, the second reflected line beam R12 having passed the second optical path w2 is caused to form an image on the first region $S_{31}$ of the third segment S3. Note that the shifting in the direction X' and rotating about an axis extending in the direction X' of the second reflecting prism 44 may be performed in any order, and is not limited to Example 1. In addition, although in Example 1 the second reflecting prism 44 is rotated in the right direction to cause the second reflected line beam R12 to be shifted from the center to the negative side in the direction Z', it goes without saying that the direction in which to rotate the second reflecting prism 44 about an axis extending in the direction X' may be determined according to the shift direction (on which reception region to form an image on the receiving surface 18).

Appropriate measurement can be carried out by adjusting the measuring apparatus 101 in this manner at the time of manufacturing the apparatus. Note that this positional adjustment may be performed manually or may be performed automatically by the controller 15 (for example, a measurement target as a standard may be mounted on the stage 12, and the imaging device 17 may be caused to acquire a reflected line beam R1 reflected therefrom). Hence, in the reception optical system 361, the splitting prism 42, the first reflecting prism 43, the second reflecting prism 44 and the combining prism 45 form a light splitting mechanism (see reference numeral 32 of FIG. 2), in which only the measurement position of the measurement target differs between the first reflected line beam R11 having passed the first optical path w1 and the second reflected line beam R12 having passed the second optical path w2.

Thus, the reception optical system 361 is capable of simultaneously acquiring the first reflected line beam R11 having passed the first optical path w1 and the second reflected line beam R12 having passed the second optical path w2, the two reflected line beams R1 being different from each other only in the measurement positions of the measurement target on the same line beam L. Here, in order to enhance the accuracy of measured data, it is preferable that an incident light limitation mechanism is provided in front of the receiving surface 18 of the imaging device 17, so that only the reflected line beam R1 having passed the corresponding optical imaging system is caused to form an image (incident) on each reception region (the first region $S_{21}$ of the second segment S2 and the first segment $S_{31}$ of the third segment S3 in Example 1). For example, this incident-light limitation mechanism may be formed by: using light-guiding means that guides the first reflected line beam R11 having been emitted from the combining prism 45 to the first region $S_{21}$ of the second segment S2 and guides the second reflected line beam R12 having been emitted from the combining prism 45 to the first region $S_{31}$ of the third segment S3; or providing a light-shielding member having a light absorbing property to separate the first optical path w1 and the second optical path w2 without interfering with the first optical path w1 or the second optical path w2.

Since 2 pieces of measured data in which only the measurement position of the measurement target differs from each other can be acquired simultaneously in the measuring apparatus 101 of Example 1 employing the above-mentioned reception optical system 361, the 2 pieces of data may be displayed on the display 14 separately, simultaneously or in a combined state.

In the measuring apparatus 101 of Example 1, 2 pieces of measured data (measured data measured in an acquisition region As1 and measured data measured in an acquisition region As2) having the same resolution in the direction X and in the direction Z, and whose measurement positions in the direction X differ from each other can be acquired by a single measuring movement, that is, by a single scanning operation. Accordingly, measured data for approximately 2 measurements can be acquired without lowering the measurement accuracy, and thus the overall inspection speed (throughput) can be improved. Here, since the apparatus is configured in a way that the first reflected line beam R11 having passed the first optical path w1 is caused to form an image on the first region $S_{21}$ of the second segment S2 on the receiving surface 18 of the imaging device 17 and the second reflected line beam R12 having passed the second optical path w2 is caused to form an image on the first region $S_{31}$ of the third segment S3 on the receiving surface 18 of the imaging device 17 to acquire the 2 pieces of measured data, the 2 pieces of measured data can be simultaneously processed in the imaging device at an extremely high speed (the minimum output processing time in the imaging device 17). Hence, the required amount of time for a single measuring operation, that is, for a single scanning operation is not enlarged.

Moreover, in the measuring apparatus 101 of Example 1, when the components (the lens 41, the splitting prism 42, the first reflecting prism 43, the second reflecting prism 44, the combining prism 45 and the imaging device 17) are fabricated as the reception optical system 361, the following adjustments can be carried out. Specifically, the position on which the first reflected line beam R11 having passed the first optical path w1 is caused to form an image on the receiving surface 18 of the imaging device 17 can be adjusted by moving the first reflecting prism 43 in the direction Y' and rotating the first reflecting prism 43 about an axis extending in the direction X', and the position on which the second reflected line beam R12 having passed the second optical path w2 is caused to form an image on the receiving surface 18 of the imaging device 17 can be adjusted by moving the second reflecting prism 44 in the direction X' and rotating the second reflecting prism 44 about an axis extending in the direction X'.

Furthermore, in the reception optical system 361 of the measuring apparatus 101 of Example 1, the single reflected line beam R1 whose measurable range (magnification) of the object of measurement in the measurement target and the resolution for the measurement target are adjusted by the single lens 41 is split into the first optical path w1 and the second optical path w2, so that only the measurement positions thereof on the line beam L differ from each other. Consequently, the measurable range (magnification) of the object of measurement in the measurement target and the resolution for the measurement target can be made exactly the same in the pieces of measured data measured from the first reflected line beam R11 having passed the first optical path w1 and measured from the second reflected line beam R12 having passed the second optical path w2.

Accordingly, in the measuring apparatus 101 of Example 1, the measuring time can be shortened while maintaining certain accuracy.

Note that although in Example 1, the measurement positions on the line beam L radiated on the measurement target (wafer 16) mounted on the stage 12 of the first reflected line beam R11 having passed the first optical path w1 and the second reflected line beam R12 having passed the second optical path w2 are adjacent to each other, the measurement positions are not limited to Example 1. It suffices that the two measurement positions are different from each other, and the measurement positions may be set apart from each other.

In addition, although in Example 1, the single reflected line beam R1 whose measurable range (magnification) of the object of measurement in the measurement target and the resolution for the measurement target are adjusted by the single lens 41 is split into the first optical path w1 and the second optical path w2, the invention is not limited to Example 1. Alternatively, the optical paths (the first optical path w1 and the second optical path w2) may be adjusted to have the same measurable range (magnification) of the object of measurement in the measurement target and the same resolution for the measurement target after the reflected line beam R1 is spitted into the first optical path w1 and the second optical path w2. With this configuration, the path lengths of the first optical path w1 and the second optical path w2 need not be may the same, and thus the optical system can be designed more freely.

Further, in Example 1, the position on which the first reflected line beam R11 having passed the first optical path w1 is caused to form an image on the receiving surface 18 of the imaging device 17 is adjusted by moving the first reflecting prism 43 in the direction Y' and rotating the first reflecting prism 43 about an axis extending in the direction X', and the position on which the second reflected line beam R12 having passed the second optical path w2 is caused to form an image on the receiving surface 18 of the imaging device 17 is adjusted by moving the second reflecting prism 44 in the direction X' and rotating the second reflecting prism 44 about an axis extending in the direction X'. However, the invention is not limited to Example 1, and it suffices that the position on which each of the first reflected line beam R11 having passed the first optical path w1 and the second reflected line beam R12 having passed the second optical path w2 is caused to form an image on the receiving surface 18 is adjusted in 2 directions including the direction X' and the direction Z', For example, the position on the receiving surface 18 on which the first reflected line beam R11 having passed the first optical path w1 is caused to form an image can be adjusted in the direction Z', by rotating the first reflecting prism 43 within an X'-Y' plane (about an axis extending in the direction Z') instead of shifting the first reflecting prism 43 in the direction Y'. Similarly, the position on the receiving surface 18 on which the second reflected line beam R12 having passed the second optical path w2 is caused to form an image can be adjusted in the direction Z', by rotating the second reflecting prism 44 within the plane (about an axis extending in the direction Z') instead of shifting the second reflecting prism 44 in the direction X'. Alternatively, the adjustment can be carried out easily with the configuration in FIG. 7 by fixing the first reflecting prism 43 and the second reflecting prism 44, while providing a pair of wedge prisms (not shown) in each of the first optical path w1 and the second optical path w2.

In Example 1 described above, the measurement apparatus 101 is configured so that the first reflected line beam R11 having passed the first optical path w1 is caused to form an image on the first region $S_{21}$ of the second segment S2 on the receiving surface 18 of the imaging device 17 and the second reflected line beam R12 having passed the second optical path w2 is caused to form an image on the first region $S_{31}$ of the third segment S3 on the receiving surface 18 of the imaging device 17. However, the invention is not limited to Example 1, and other configurations may be employed as long as the reflected line beams R1 are caused to form images on (use) different reception regions.

Modified Example 1

Figure 9:
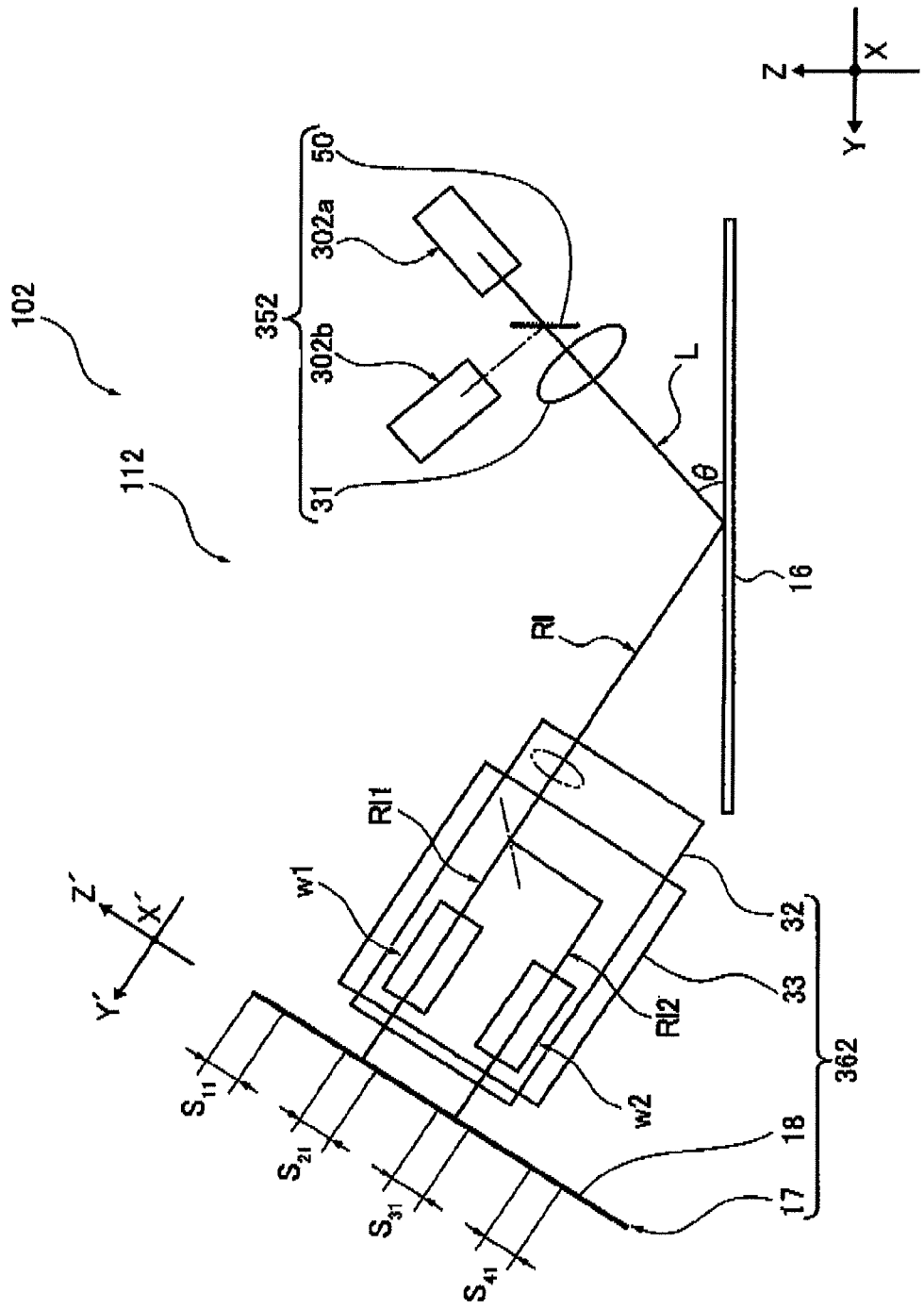
FIG. 9 is an explanatory view similar to FIG. 2, schematically showing a relationship between a measurement target (wafer 16) and an optical system 112 in a measuring apparatus 102 of Modified Example 1.

Next, Modified Example 1 of Example 1 will be described. A characteristic of Modified Example 1 is that 2 wavelengths arc combined to generate a single line beam L in a projection optical system 352. Incidentally, since a measuring apparatus 102 of Modified Example 1 has basically the same configuration as the aforementioned measuring apparatus 10 and the measuring apparatus 101 of Example 1, parts having the same configuration are assigned the same reference numerals, and detailed descriptions thereof are omitted. FIG. 9 is an explanatory drawing similar to FIG. 2, schematically showing a relationship between a measurement target (wafer 16) and an optical system 112 in the measuring apparatus 102 of Modified Example 1.

As shown in FIG. 9, in the optical system 112 of the measuring apparatus 102 of Modified Example 1, the projection optical system 352 is formed of 2 light sources 302a, 302b, a wavelength combining mirror 50 and a collimating lens 31. In the projection optical system 352, the light sources 302a and 302b are configured to emit light beams having different wavelengths. This configuration mainly aims to split a reflected line beam R1 by a splitting prism 42 so that the split reflected line beams R1 may be guided to 2 optical imaging systems provided in a reception optical system 362 in the optical system 112. In some cases, the configuration aims to cause the reflected line beams R1 to selectively enter the reception regions on a receiving surface 18 of an imaging device 17. The light beams having been emitted from the light sources 302a and 302b form a single line beam L as will be described later. The reflected line beam R1 reflected from the measurement target (wafer 16) need to be captured in the imaging device 17, and thus the wavelengths of the light beams emitted from the light sources 302a and 302b are different from each other within a receivable wavelength region (sensitivity) of the imaging device 17. In Modified Example 1, under the assumption that the reflected line beam R1 can be split (selectively enter in some cases) as mentioned above, the light beams emitted from the light sources 302a and 302b are caused to have wavelengths as similar to each other as possible. This is because the wider the receivable wavelength region (sensitivity) in the imaging device 17 becomes, the more expensive the imaging device 17 becomes. Note that the light sources 302a and 302b are not limited to those shown in Example 1, and may be configured otherwise, as long as the light sources use different wavelengths within the receivable wavelength region (sensitivity) of the imaging device in use.

In this projection optical system 352, the wavelength combining mirror 50 and the collimating lens 31 are provided on the optic axis of the beam emitted from the light source 302a, and the radiation position on the stage 12 is set on the optic axis. The light source 302b is positioned so that the beam emitted therefrom is reflected by the wavelength combining mirror 50 to then proceed on the optic axis of the beam emitted from the light source 302a, toward the collimating lens 31. Accordingly, the wavelength combining mirror 50 is set to allow the beam from the light source 302a to pass through, and to reflect the beam from the light source 302b. The collimating lens 31 converts the beams emitted from the light sources 302a and 302b, which are caused to proceed on the same optic axis by the wavelength combining mirror 50, into a single line beam L that is radiated on the measurement target (wafer 16) mounted on the stage 12. Accordingly, in the measuring apparatus 102, beams having 2 different wavelengths emitted from 2 light sources 302a and 302b are regarded as the line beam L on the same optic axis, and radiated on the measurement target (wafer 16) mounted on the stage 12.

The reception optical system 362 in the optical system 112 has the same configuration as that shown in FIG. 2, and can basically be implemented with the same configuration as that shown in FIG. 7. Here, since the line beam L is formed by combining 2 wavelengths in Modified Example 1, light transmission efficiency can be improved by using a wavelength separation mirror as a splitting prism 42, and using a wavelength combination and separation mirror as a combining prism 45 (see FIG. 7).

Additionally, in the case of providing an incident-light limitation mechanism in front of the receiving surface 18 of the imaging device 17 for enhancement of accuracy of measured data as mentioned above, a bandpass filter configured to allow beams having a certain wavelength to pass through may be used as the incident-light limitation mechanism.

Modified Example 2

Figure 10:
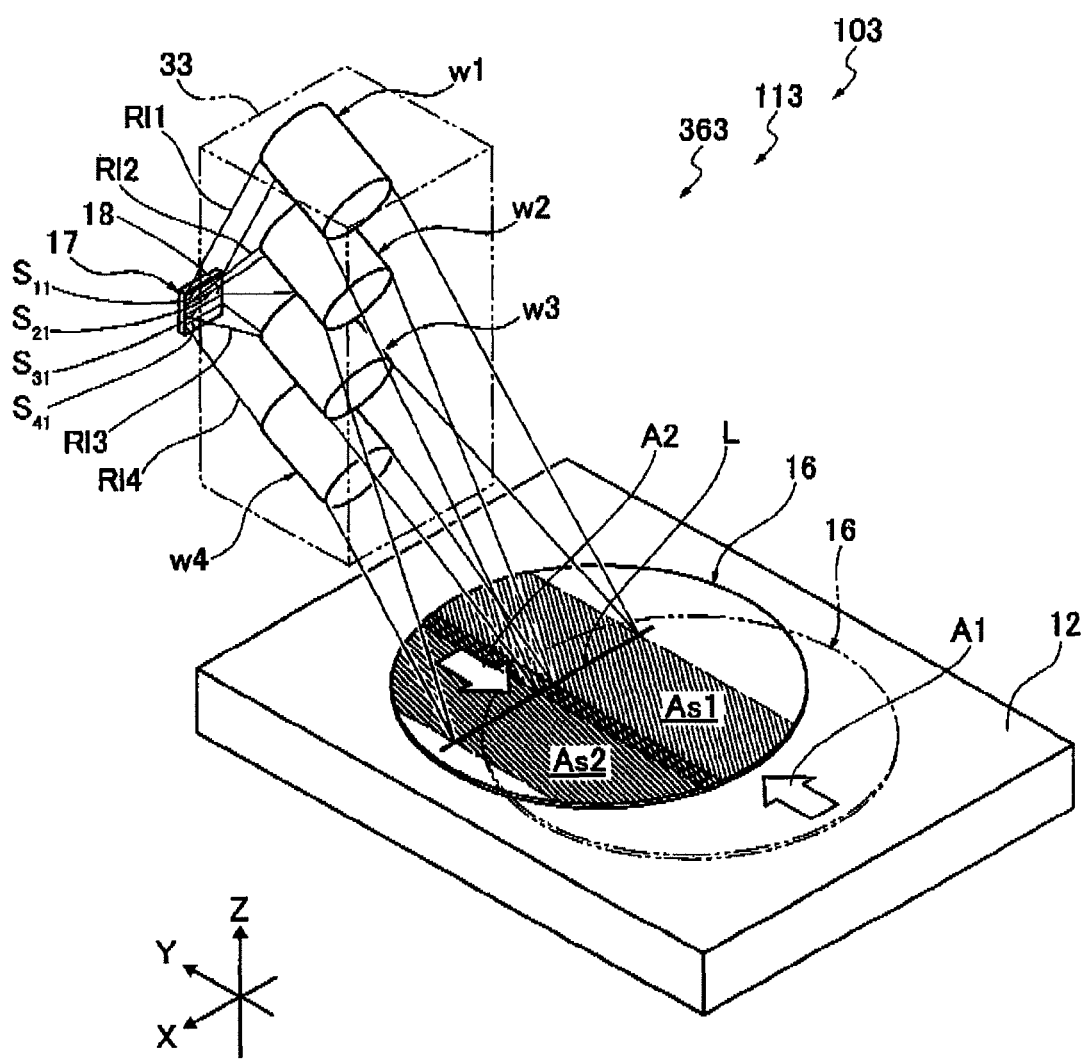
FIG. 10 is a schematic explanatory view similar to FIG. 3, for describing a slide movement of a measurement target (wafer 16) on a stage 12 in a measuring apparatus 103.
Figure 11:
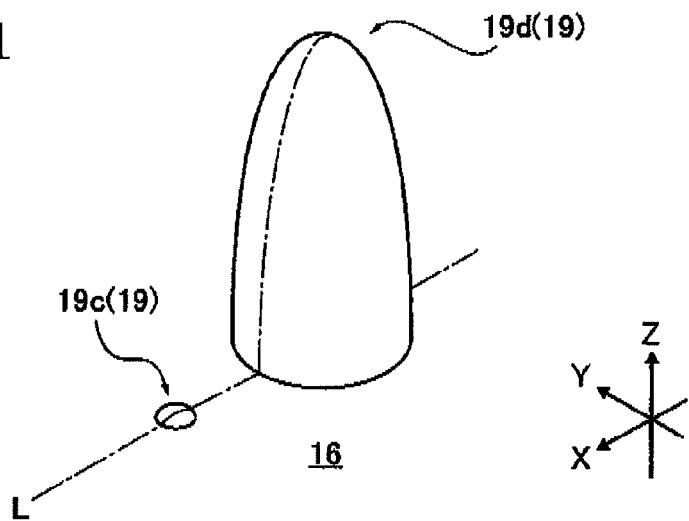
FIG. 11 is an explanatory view schematically showing a state of an object of measurement (bumps 19c and 19d) on the measurement target (wafer 16), to describe measurement by the measuring apparatus 103.
Figure 12A:
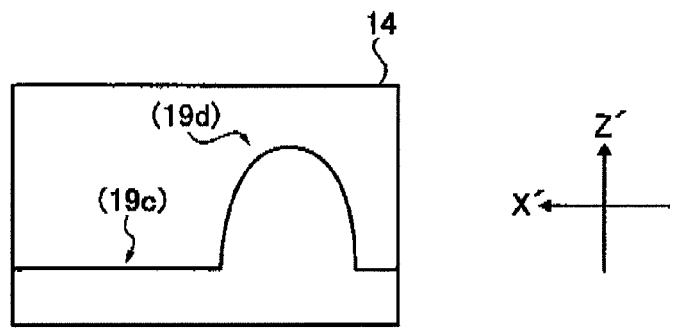
Figure 12B:
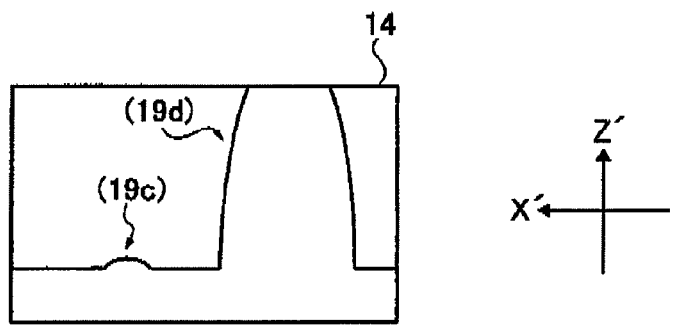
FIG. 12B shows measured data acquired from a side corresponding to an optical path w3 and an optical path w4.
Figure 12C:
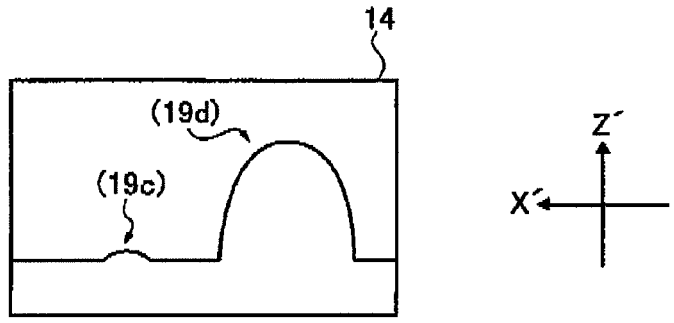
FIG. 12C shows a state where the pieces of measured data shown in FIGS. 12A and 12B are combined.

Next, Modified Example 2 of Example 1 will be described. A characteristic of Modified Example 1 is that in a reception optical system 363 in an optical system 113, in addition to a first reflected line beam R11 and a second reflected line beam R12 whose measurement positions on a line beam L radiated on a measurement target (wafer 16) mounted on a stage 12 are adjacent to each other, a third reflected line beam R13 and a fourth reflected line beam R14 are used. The third and fourth reflected line beams R13 and R14 have the same measurement positions as the first and second reflected line beams R11 and R12, respectively, while only the measurable range (magnification) in the height direction (direction Z) of the object of measurement (each bump 19 in the above example) in the measurement target is set differently for the third and fourth reflected line beams R13 and R14. Incidentally, since a measuring apparatus 103 of Modified Example 2 has basically the same configuration as the aforementioned measuring apparatus 10 and the measuring apparatus 101 of Example 1, parts having the same configuration are assigned the same reference numerals, and detailed descriptions thereof are omitted. FIG. 10 is a schematic explanatory drawing similar to FIG. 3, for describing a slide movement of a measurement target (wafer 16) on a stage 12 in the measuring apparatus 103. FIG. 11 is an explanatory drawing schematically showing a state of the object of measurement (bumps 19c and 19d) on the measurement target (wafer 16), to describe measurement by the measuring apparatus 103. FIGS. 12A to 12C are explanatory drawings each schematically showing a state where measured data measured from the object of measurement (bumps 19 c and 19d) shown in FIG. 11 is displayed on a display 14 as a visualized diagram. FIG. 12A shows measured data acquired from a side corresponding to an optical path w1 and an optical path w2; FIG. 12B shows the measured data acquired from a side corresponding to an optical path w3 and an optical path w4; and FIG. 12C shows a state where the pieces of measured data shown in FIGS. 12A and 12B are combined.

As shown in FIG. 10, in a reception optical system 363 of Modified Example 2, a third optical path w3 and a fourth optical path w4 are provided in addition to a first optical path w1 and a second optical path w2 in a beam splitting mechanism 33. Although basic configurations of the first optical path w1 and the second optical path w2 are the same as those shown in FIG. 3, in Modified Example 2, the first optical path w1 causes the first reflected line beam 1,11 to form an image on a first region $S_{11}$ of a first segment S1 on a receiving surface 18 of an imaging device 17, and the second optical path w2 causes the second reflected line beam R12 to form an image on a first region $S_{21}$ of a second segment 32 on the receiving surface 18 of the imaging device 17.

The third optical path w3 has the same measurement position as the first optical path w1, and only the measurable range (magnification) in the height direction (direction Z) of the object of measurement (each bump 19 in the above example) in the measurement target is different from the first optical path w1. The third optical path w3 causes the third reflected line beam R13 to form an image on a first region $S_{31}$ of a third segment S3 on the receiving surface 18 of the imaging device 17.

Meanwhile, the fourth optical path w4 has the same measuring position as the second optical path w2, and only the measurable range (magnification) in the height direction (direction Z) of the object of measurement (each bump 19 in the above example) in the measurement target is different from the second optical path w2. The fourth optical path w4 causes the fourth reflected line beam R14 to form an image on a first region $S_{41}$ of a fourth segment S4 on the receiving surface 18 of the imaging device 17.

The third optical path w3 and the fourth optical path w4 have the same measurable range (magnification) in the height direction (direction Z) of the object of measurement (each bump 19 in the above example) in the measurement target. To be specific, the first reflected line beam R11 having passed the first optical path w1 and the second reflected line beam R12 having passed the second optical path w2 are set to have a low magnification (as compared to the third reflected line beam R13 and the fourth reflected line beam R14) on the receiving surface 18 of the imaging device 17, while the third reflected line beam R13 having passed the third optical path w3 and the fourth reflected line beam R14 having passed the fourth optical path w4 are set to have a high magnification (as compared to the first reflected line beam R11 and the second reflected line beam R12). The third optical path w3 and the fourth optical path w4 can be implemented merely by changing the lens (41) and optical characteristics in each path length using the same configuration as the reception optical system 361 shown in FIG. 7.

Thus, in the reception optical system 368 of Modified Example 2, a first measured data can be acquired from the first reflected line beam R11 having passed the first optical path w1 and the second reflected line beam R12 having passed the second optical path w2, and a second measured data can be acquired from the third reflected line beam R13 having passed the third optical path w3 and the fourth reflected line beam R14 having passed the fourth optical path w4. Specifically, the first measured data is acquired from different measurement positions which are adjacent to each other, the second measured data is also acquired from different measurement positions which are adjacent to each other, and the second measured data has a measurable range (magnification) in the height direction (direction Z) of the object of measurement (each bump 19 in the above example) in the measurement target different from that of the first measured data.

Since 2 pieces of measured data in which only the measurement range (magnification) in the height direction (direction Z) of the object of measurement (each bump 19 in the above example) in the measurement target differs from each other can be acquired simultaneously in the measuring apparatus 103 of Modified Example 2 employing the above-mentioned reception optical system 363, the 2 pieces of data may be displayed on the display 14 separately, simultaneously or in a combined state. A specific description will be given below.

Firstly, for example, in the reception optical system 363, the height (total number of pixels) in the direction Z' in the reception regions corresponding to the first optical path w1 and the second optical path w2 (the first region $S_{11}$ of the first segment S1 and the first region $S_{21}$ of the second segment S2) corresponds to 100 μm in the direction Z on the wafer 16 (see FIG. 3). Meanwhile, the height (total number of pixels) in the direction Z' in the reception regions corresponding to the third optical path w3 and the fourth optical path w4 (the first region $S_{31}$ of the third segment S3 and the first region $S_{41}$ of the fourth segment S4) corresponds to 10 µm in the direction Z on the wafer 16 (see FIG. 3). In addition, as shown in FIG. 11, 2 bumps 19c and 19d whose sizes largely differ from each other are provided in the wafer 16 being the measurement target. The height (in the direction Z) of the bump 19c is 3 µm, and the height (in the direction 2) of the bump 19d is 60 µm.

Then, in the first measured data acquired from the first optical path w1 and the second optical path w2, the height (total number of pixels) in the direction 2' in the reception regions corresponds to 100 µm in the direction Z on the wafer 16. Accordingly, as shown in FIG. 12A, the bump 19d whose height is 60 µm is within the measurable range (magnification), and thus the measurement result of 60 µm can be obtained. Meanwhile, the bump 19c whose height is 3 µm is not within the measurable range (magnification) (the bump 19c is too small), and thus as shown in FIG. 12A, the bump 19c cannot be measured since it cannot be distinguished from a noise. Otherwise, a measurement result (height) including an extremely large error may be obtained.

In the second measured data acquired from the third optical path w3 and the fourth optical path w4, the height (total number of pixels) in the direction Z' in the reception regions corresponds to 10 µm in the direction Z on the wafer 16. Accordingly, as shown in FIG. 12B, the bump 19c whose height is 3 µm is within the measurable range (magnification), and thus the measurement result of 3 µm can be obtained. Meanwhile, the bump 19d whose height is 60 µm is not within the measurable range (magnification) (the bump 19c is too large), and thus as shown in FIG. 12B, the measurement result shows that the height exceeds the maximum measurable height, and the height cannot be obtained.

However, since the measuring apparatus 103 can acquire both of the above-mentioned pieces of measured data by a single scanning operation (measuring movement), appropriate measurement results (heights) can be acquired from any of the first measured data and the second measured data. Accordingly, in the measuring apparatus 103, when measured data is displayed on a display 14 as a visualized diagram under control of a controller 16, a diagram in which both measurement results (heights) are combined can be displayed, as shown in FIG. 12C. In this diagram in which both measurement results (heights) are combined, the resolution for the measurement target (wafer 16) in the direction X is set to be the same for both pieces of measured data in Modified Example 2, and thus the X coordinate for the object of measurement is the same in measured data acquired from any of the optical imaging systems. For this reason, simply, measured data acquired from the optical imaging system that includes the object of measurement (bumps 19c and 19d in this example) within the measurable range (magnification) thereof can be displayed. In this example, the diagram based on the second measured data is displayed for the bump 19c, and the diagram based on the first measured data is displayed for the bump 19d. Here, when the controller 15 selects the optical imaging system that includes the object of measurement (bumps 19c and 19d in this example) within the measurable range (magnification) thereof, the controller 15 may preferentially select the optical imaging system whose measured data is a height within the measurable range thereof and also is a large value. Incidentally, in the combined diagram, the relationship among the sizes of diagrams to be displayed may be modified according to measured data, so that an image of the actual relationship among the sizes of multiple objects of measurement can be maintained. With this, although not completely the same as the relationship among sizes according to the actual scale, the height of the objects can be grasped at a look.

In the measuring apparatus 103 of Modified Example 2, the first measured data measured from different measurement positions adjacent to each other can be acquired from the first reflected line beam R11 having passed the first optical path w1 and the second reflected line beam R12 having passed the second optical path w2. At the same time, the second measured data also measured from different measurement positions adjacent to each other and having a measurable range (magnification) in the height direction (direction Z) of the object of measurement (each bump 19 in the above example) of the measurement target different from the first measured data, can be acquired from the third reflected line beam R13 having passed the third optical path w3 and the fourth reflected line beam R14 having passed the fourth optical path w4. Thus, measured data for approximately 2 scanning operations (measuring movements) including the first measured data and the second measured data can be acquired from a single scanning operation. Consequently, the overall inspection speed (throughput) can be improved, and the substantial measurable range (magnification) can be widened.

Modified Example 3

Figure 13:
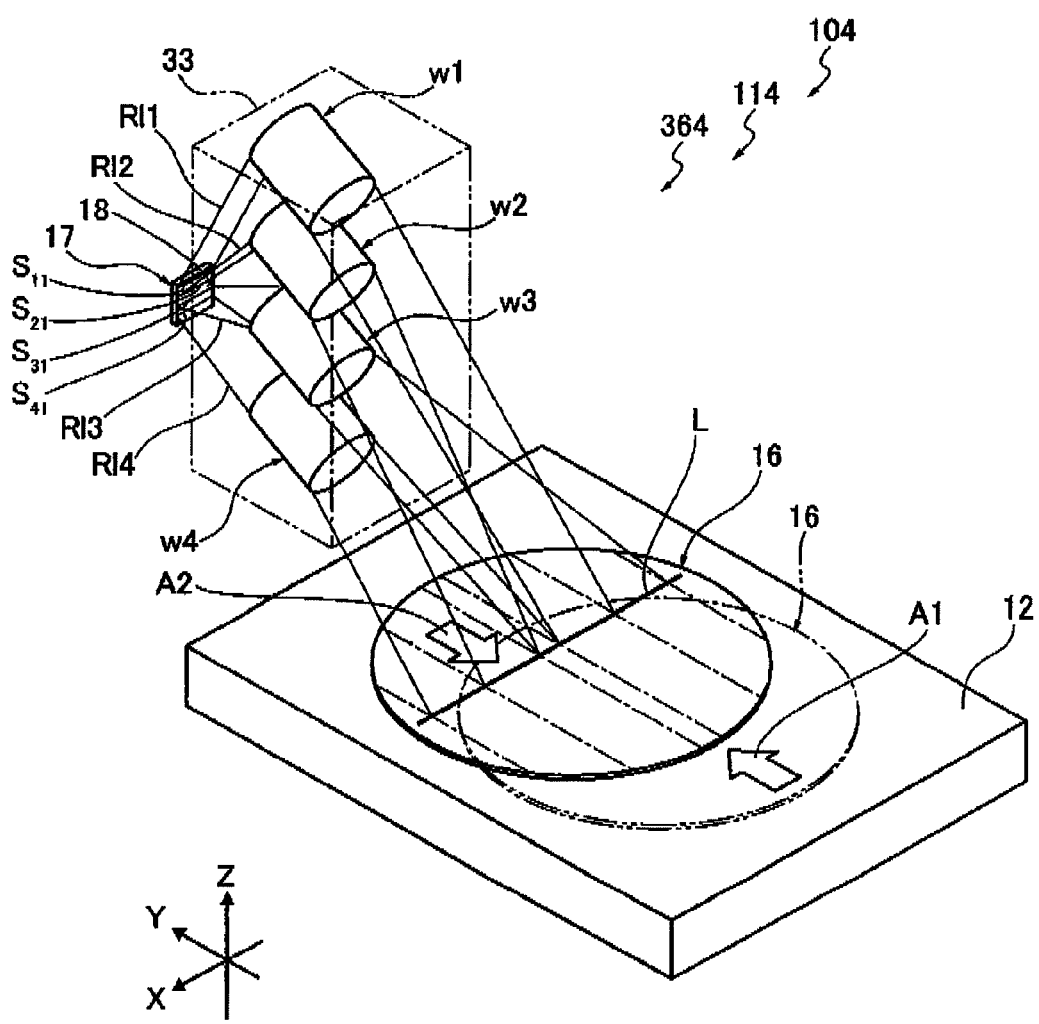
FIG. 13 is a schematic explanatory view similar to FIG. 3, for describing a slide movement of a measurement target (wafer 16) on a stage 12 in a measuring apparatus 104.

Next, Modified Example 3 of Example 1 will be described. A characteristic of Modified Example 3 is that in a reception optical system 364 of an optical system 114, in addition to a first reflected line beam R11 and a second reflected line beam R12 whose measurement positions on a line beam L radiated on a measurement target (wafer 16) mounted on a stage 12 are adjacent to each other, a third reflected line beam R13 and a fourth reflected line beam 114 are used. The third and fourth reflected line beams R13 and R14 have a different resolution for the object of measurement from the resolution of the first and second reflected line beams R11 and R12. Incidentally, since a measuring apparatus 104 of Modified Example 3 has basically the same configuration as the aforementioned measuring apparatus 10 and the measuring apparatus 101 of Example 1, parts having the same configuration are assigned the same reference numerals, and detailed descriptions thereof are omitted. FIG. 13 is a schematic explanatory drawing similar to FIG. 3, for describing a slide movement of a measurement target (wafer 16) on a stage 12 in the measuring apparatus 104.

As shown in FIG. 13, in a reception optical system 364 of Modified Example 3, a third optical path w3' and a fourth optical path w4' are provided in addition to a first optical path w1 and a second optical path 2 in a beam splitting mechanism 38. Although basic configurations of the first optical path w1 and the second optical path w2 are the same as those shown in FIG. 3, in Modified Example 3, the first optical path w1 causes the first reflected line beam R11 to form an image on a first region $S_{11}$ of a first segment S1 on a receiving surface 18 of an imaging device 17, and the second optical path w2 causes the second reflected line beam R12 to form an image on a first region $S_{21}$ of a second segment S2 on the receiving surface 18 of the imaging device 17.

Since the resolution for the object of measurement of the third optical path w3' and the fourth optical path w4' is different from that of the first optical path w1 and the second optical path w2, the size of the measurement range in the direction X of the measurement target mounted on the stage 12 is different between the optical paths having the different resolutions. In Modified Example 3, the third optical path w3' and the fourth optical path w4' have different measurement positions adjacent to each other on the same line beam L, and measure the object of measurement by a lower resolution, that is, for a wider range in the direction X (capable of acquiring data for a wide range) than the optical path w1 and the optical path w2.

The third optical path w3' causes the third reflected line beam R13 to form an image on a first region $S_{31}$ of a third segment S3 on the receiving surface 18 of the imaging device 17, and the fourth optical path w4' causes the fourth reflected line beam R14 to form an image on a first region $S_{41}$ of a fourth segment S4 on the receiving surface 18 of the imaging device 17.

In the third optical path w3' and the fourth optical path w4', the measurable range (magnification) of the object of measurement (each bump 19 in the above example) in the measurement target is set to be the same. The third optical path w3' and the fourth optical path w4' can be implemented merely by changing the lens (41) and optical characteristics in each path length using the same configuration as the reception optical system 361 shown in FIG. 7. Here, the third optical path w3' and the fourth optical path w4' may have the same measurable range (magnification) in the height direction (direction Z) of the object of measurement (each bump 19 in the above example) in the measurement target as the first optical path w1 and the second optical path w2, or may have a different measurable range.

Thus, in the reception optical system 364 of Modified Example 3, the first measured data measured from different measurement positions adjacent to each other can be acquired from the first reflected line beam R11 having passed the first optical path w1 and the second reflected line beam R12 having passed the second optical path w2. At the same time, the second measured data also measured from different measurement positions adjacent to each other and having a resolution for the object of measurement different from the first measured data, can be acquired from the third reflected line beam R13 having passed the third optical path w3' and the fourth reflected line beam R14 having passed the fourth optical path w4'. Thus, measured data for approximately 2 scanning operations (measuring movements) including the first measured data and the second measured data can be acquired from a single scanning operation. Consequently, the overall inspection speed (throughput) can be improved.

According to the measuring apparatus of an embodiment of the present invention, pieces of measured data measured at different measurement positions in a measurement target can be acquired for the number of reflected line beams into which a line beam L is split by a beam splitting mechanism can be acquired from a single measuring movement, that is, by a single scanning operation. At this time, for acquisition of the multiple pieces of measured data, the apparatus is configured to cause the reflected line beams having been split by the beam splitting mechanism and passed the optical imaging systems to respectively form images on different reception regions on the receiving surface of the imaging device. Accordingly, the multiple pieces of measured data can be processed simultaneously at a high speed in the imaging device, and thus elongation in the measuring time can be prevented. As a result, the overall inspection speed can be improved.

In addition to the above configuration, since the reception region mentioned above is the region for which output processing is firstly performed in each segment on the receiving surface of the imaging device, the multiple pieces of measured data can be processed simultaneously at an extremely high speed in the imaging device, and thus elongation in the measuring time can be prevented more effectively.

In addition to the above configuration, if the beam splitting mechanism is to split the reflected line beam after optical setting for the object of measurement in the measurement target is made therein, the multiple pieces of measured data can be caused to have completely same optical settings for the object of measurement in the measurement target.

In addition to the above configuration, if the beam splitting mechanism can acquire the shape of the line beam on the measurement target at different positions on the extending direction of the line beam, by splitting the reflected line beam and then varying each of the positions of the split reflected line beams on a plane corresponding to the receiving surface of the imaging device in 2 intersecting directions, adjustments can be easily made in the optical setting for the imaging device in the beam splitting mechanism.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A measuring apparatus comprising:
a projection optical system configured to radiate a line beam extending in one direction on a measurement target;
an imaging device configured to acquire a reflected line beam reflected from the measurement target, the measuring apparatus measuring a surface shape of the measurement target on the basis of a geometric positional relationship in the reflected line beam on the measurement target, the reflected line beam being acquired by the imaging device;
an optical imaging system provided between the measurement target and the imaging device, and configured to cause the reflected line beam to form an image on a receiving surface of the imaging device so that a shape of the line beam on the measurement target is acquired; and
a beam splitting mechanism configured to split the reflected line beam and guide the split reflected line beam to the imaging device, wherein
the beam splitting mechanism splits the reflected line beam so that the shape of the line beam on the measurement target is acquired at different measurement positions in the extending direction of the line beam;
a plurality of segments are set on the receiving surface of the imaging device while each of the segments is partitioned into a plurality of regions, and at least one region in each of the segments is set as a reception region; and
the optical imaging system causes the reflected line beams split by the beam splitting mechanism to form images on the reception regions in the different segments, respectively, on the receiving surface of the imaging device.

2. The measuring apparatus according to claim 1, wherein the reception region is a region for which output processing is firstly performed in each of the segments on the receiving surface of the imaging device.

3. The measuring apparatus according to claim 1, wherein the beam splitting mechanism splits the reflected line beam after optical setting of the reflected line beam is made for an object of measurement in the measurement target.

4. The measuring apparatus according to claim 2, wherein the beam splitting mechanism splits the reflected line beam after optical setting of the reflected line beam is made for an object of measurement in the measurement target.

5. The measuring apparatus according to claim 3, wherein the beam splitting mechanism enables acquisition of the shape of the line beam on the measurement target at different measurement positions in the extending direction of the line beam, by splitting the reflected line beam and then varying the position of each of the reflected line beams in two intersecting directions on a plane along the receiving surface of the imaging device.

6. The measuring apparatus according to claim 4, wherein the beam splitting mechanism enables acquisition of the shape of the line beam on the measurement target at different measurement positions in the extending direction of the line beam, by splitting the reflected line beam and then varying the position of each of the reflected line beams in two intersecting directions on a plane along the receiving surface of the imaging device.

* * * * *